US006980089B1

(12) United States Patent
Kline

(10) Patent No.: US 6,980,089 B1
(45) Date of Patent: Dec. 27, 2005

(54) NON-INTRUSIVE COUPLING TO SHIELDED POWER CABLE

(75) Inventor: Paul A. Kline, Gaithersburg, MD (US)

(73) Assignee: Current Technologies, LLC, Germantown, MD (US)

( * ) Notice: Subject to any disclaimer, the term of this patent is extended or adjusted under 35 U.S.C. 154(b) by 0 days.

(21) Appl. No.: 09/924,730

(22) Filed: Aug. 8, 2001

Related U.S. Application Data

(60) Provisional application No. 60/224,031, filed on Aug. 9, 2000.

(51) Int. Cl.[7] .............................................. H04M 11/04

(52) U.S. Cl. ............................ 340/310.01; 340/310.02; 340/310.03; 340/310.06; 340/310.07; 340/310.08

(58) Field of Search ....................... 340/310.01, 310.02, 340/310.03, 310.06, 310.07, 310.08; 455/402

(56) References Cited

U.S. PATENT DOCUMENTS

| | | | | |
|---|---|---|---|---|
| 1,547,242 A | | 7/1925 | Strieby | |
| 2,298,435 A | | 10/1942 | Tunick | 370/492 |
| 2,577,731 A | | 12/1951 | Berger | 179/2.5 |
| 3,369,078 A | | 2/1968 | Stradley | 179/2.5 |
| 3,445,814 A | | 5/1969 | Spalti | 340/151 |
| 3,605,009 A | * | 9/1971 | Enge | 323/293 |
| 3,641,536 A | | 2/1972 | Prosprich | 340/870.15 |
| 3,656,112 A | | 4/1972 | Paull | 340/151 |
| 3,696,383 A | | 10/1972 | Oishi et al. | 340/310 |
| 3,702,460 A | | 11/1972 | Blose | 340/150 |
| 3,810,096 A | | 5/1974 | Kabat et al. | 340/147 R |
| 3,846,638 A | | 11/1974 | Wetherell | 307/3 |
| 3,895,370 A | | 7/1975 | Valentini | 340/310 |
| 3,911,415 A | | 10/1975 | Whyte | 340/310 |
| 3,942,168 A | | 3/1976 | Whyte | 340/310.01 |
| 3,942,170 A | | 3/1976 | Whyte | 340/310 |
| 3,962,547 A | | 6/1976 | Pattantyus-Abraham | 179/2.5 R |
| 3,964,048 A | | 6/1976 | Lusk et al. | 340/310 R |
| 3,967,264 A | | 6/1976 | Whyte et al. | 340/310.08 |
| 3,973,087 A | | 8/1976 | Fong | 179/170 R |
| 3,973,240 A | | 8/1976 | Fong | 340/151 |
| 4,004,110 A | | 1/1977 | Whyte | 179/170 J |
| 4,004,257 A | | 1/1977 | Geissler | 333/207 |
| 4,012,733 A | | 3/1977 | Whyte | 340/310 |
| 4,016,429 A | | 4/1977 | Vercellotti et al. | 307/149 |
| 4,053,876 A | | 10/1977 | Taylor | 340/529 |
| 4,057,793 A | | 11/1977 | Johnson et al. | 340/310 R |

(Continued)

FOREIGN PATENT DOCUMENTS

| | | |
|---|---|---|
| DE | 197 28 270 A1 | 1/1999 |
| DE | 100 08 602 A1 | 6/2001 |

(Continued)

OTHER PUBLICATIONS

Liu, E. et al., "Broadband Characterization of Indoor Powerline Channel," Communications Laboratory, Helsinki University of Technology, Finland [presented at the 2004 International Symposium on PowerLine Communications and its Applications, Zaragoza, Spain. Mar. 31–Apr. 2, 2004] 6 pages.

(Continued)

*Primary Examiner*—Jeffery Hofsass
*Assistant Examiner*—Daniel Previl
(74) *Attorney, Agent, or Firm*—Mel Barnes; Manelli Denison & Selter PLLC

(57) ABSTRACT

The invention describes a method and a device for transporting a signal over a power line. The inventive method includes inducing an alternating current (AC) voltage from the power line, powering a transceiver device with the induced AC voltage, communicating the signal with the transceiver device via the power line. The method further may include transmitting and/or receiving the signal with an end user via the transceiver device. The transceiver device may be a fiber optic-based device that transmits data to the end user over non-metallic fiber optic links. The method may filter the induced AC voltage, and separately filter the signal.

48 Claims, 11 Drawing Sheets

U.S. PATENT DOCUMENTS

| | | | | | |
|---|---|---|---|---|---|
| 4,060,735 | A | | 11/1977 | Pascucci et al. | 307/3 |
| 4,070,572 | A | | 1/1978 | Summerhayes | 250/199 |
| 4,119,948 | A | | 10/1978 | Ward et al. | 340/870.02 |
| 4,142,178 | A | | 2/1979 | Whyte et al. | 340/310 |
| 4,188,619 | A | | 2/1980 | Perkins | 340/310 R |
| 4,239,940 | A | | 12/1980 | Dorfman | 179/2.51 |
| 4,250,489 | A | | 2/1981 | Dudash et al. | 340/147 T |
| 4,254,402 | A | | 3/1981 | Perkins | 340/310 R |
| 4,263,549 | A | | 4/1981 | Toppeto | 324/127 |
| 4,268,818 | A | | 5/1981 | Davis et al. | 340/870.38 |
| 4,323,882 | A | | 4/1982 | Gajjer | 340/310 R |
| 4,357,598 | A | | 11/1982 | Melvin, Jr. | 340/310 A |
| 4,359,644 | A | | 11/1982 | Foord | 307/40 |
| 4,367,522 | A | | 1/1983 | Forstbauer et al. | 363/137 |
| 4,383,243 | A | | 5/1983 | Krügel et al. | 340/310 R |
| 4,386,436 | A | | 5/1983 | Kocher et al. | 455/151.4 |
| 4,408,186 | A | | 10/1983 | Howell | 340/310 A |
| 4,409,542 | A | | 10/1983 | Becker et al. | 324/57 Q |
| 4,413,250 | A | | 11/1983 | Porter et al. | 340/310.01 |
| 4,419,621 | A | | 12/1983 | Becker et al. | 324/51 |
| 4,433,284 | A | | 2/1984 | Perkins | 323/361 |
| 4,442,492 | A | | 4/1984 | Karlsson et al. | 364/464 |
| 4,457,014 | A | | 6/1984 | Bloy | 381/98 |
| 4,468,792 | A | | 8/1984 | Baker et al. | 375/45 |
| 4,471,399 | A | | 9/1984 | Udren | 361/64 |
| 4,473,816 | A | | 9/1984 | Perkins | 340/310 |
| 4,473,817 | A | | 9/1984 | Perkins | 340/310 |
| 4,475,209 | A | | 10/1984 | Udren | 375/4 |
| 4,479,033 | A | | 10/1984 | Brown et al. | 179/2.51 |
| 4,481,501 | A | | 11/1984 | Perkins | 340/310 |
| 4,495,386 | A | | 1/1985 | Brown et al. | 455/402 |
| 4,504,705 | A | | 3/1985 | Pilloud | 381/77 |
| 4,517,548 | A | | 5/1985 | Ise et al. | 340/310 R |
| 4,569,045 | A | | 2/1986 | Schieble et al. | 370/85 |
| 4,599,598 | A | | 7/1986 | Komoda et al. | 340/310 A |
| 4,636,771 | A | | 1/1987 | Ochs | 340/310.05 |
| 4,638,298 | A | | 1/1987 | Spiro | 370/392 |
| 4,642,607 | A | | 2/1987 | Strom et al. | 340/310 |
| 4,644,321 | A | | 2/1987 | Kennon | 340/310 A |
| 4,652,855 | A | | 3/1987 | Weikel | 340/310 |
| 4,668,934 | A | | 5/1987 | Shuey | 340/310.06 |
| 4,675,648 | A | * | 6/1987 | Roth et al. | 340/310.07 |
| 4,683,450 | A | * | 7/1987 | Max et al. | 333/202 |
| 4,686,382 | A | | 8/1987 | Shuey | 307/149 |
| 4,686,641 | A | | 8/1987 | Evans | 364/580 |
| 4,697,166 | A | * | 9/1987 | Warnagiris et al. | 340/310.01 |
| 4,701,945 | A | | 10/1987 | Pedigo | 379/66 |
| 4,724,381 | A | | 2/1988 | Crimmins | 324/127 |
| 4,745,391 | A | | 5/1988 | Gajjar | 340/310 A |
| 4,746,897 | A | | 5/1988 | Shuey | 340/310 R |
| 4,749,992 | A | | 6/1988 | Fitzemeyer et al. | 340/870.02 |
| 4,766,414 | A | | 8/1988 | Shuey | 340/310 A |
| 4,772,870 | A | | 9/1988 | Reyes | 340/310 R |
| 4,785,195 | A | | 11/1988 | Rochelle et al. | 307/18 |
| 4,800,363 | A | | 1/1989 | Braun et al. | 340/310 A |
| 4,835,517 | A | | 5/1989 | van der Gracht et al. | 340/310 A |
| 4,890,089 | A | | 12/1989 | Shuey | 340/310.07 |
| 4,903,006 | A | | 2/1990 | Boomgaard | 340/310 A |
| 4,904,996 | A | | 2/1990 | Fernandes | 340/870.07 |
| 4,912,553 | A | | 3/1990 | Pal et al. | 358/86 |
| 4,962,496 | A | | 10/1990 | Vercellotti et al. | 370/204 |
| 4,973,940 | A | | 11/1990 | Sakai et al. | 340/310 R |
| 4,979,183 | A | | 12/1990 | Cowart | 375/142 |
| 5,006,846 | A | | 4/1991 | Granville et al. | 340/870.28 |
| 5,066,939 | A | | 11/1991 | Mansfield, Jr. | 340/310 R |
| 5,068,890 | A | | 11/1991 | Nilssen | 379/90 |
| 5,132,992 | A | | 7/1992 | Yurt et al. | 375/240 |
| 5,148,144 | A | * | 9/1992 | Sutterlin et al. | 340/310.01 |
| 5,151,838 | A | | 9/1992 | Dockery | 340/310 R |
| 5,185,591 | A | | 2/1993 | Shuey | 340/310 A |
| 5,191,467 | A | | 3/1993 | Kapany et al. | 359/341 |
| 5,210,519 | A | | 5/1993 | Moore | 340/310 |
| 5,257,006 | A | | 10/1993 | Graham et al. | 340/310 A |
| 5,264,823 | A | | 11/1993 | Stevens | 340/310.04 |
| 5,272,462 | A | | 12/1993 | Teyssandier et al. | 340/310.01 |
| 5,301,208 | A | | 4/1994 | Rhodes | 375/36 |
| 5,319,634 | A | | 6/1994 | Bartholomew et al. | 370/18 |
| 5,341,265 | A | | 8/1994 | Westrom et al. | 361/44 |
| 5,351,272 | A | | 9/1994 | Abraham | 375/38 |
| 5,355,109 | A | | 10/1994 | Yamazaki | 336/92 |
| 5,359,625 | A | | 10/1994 | Vander Mey et al. | 375/1 |
| 5,369,356 | A | | 11/1994 | Kinney et al. | 324/142 |
| 5,375,141 | A | | 12/1994 | Takahashi | 375/1 |
| 5,387,821 | A | * | 2/1995 | Steciuk et al. | 307/105 |
| 5,406,249 | A | | 4/1995 | Pettus | 340/310.06 |
| 5,410,720 | A | | 4/1995 | Osterman | 725/150 |
| 5,426,360 | A | | 6/1995 | Maraio et al. | 324/126 |
| 5,432,841 | A | | 7/1995 | Rimer | 455/457 |
| 5,448,229 | A | | 9/1995 | Lee, Jr. | 340/870.02 |
| 5,461,629 | A | | 10/1995 | Sutterlin et al. | 371/30 |
| 5,477,091 | A | | 12/1995 | Fiorina et al. | 307/66 |
| 5,481,249 | A | | 1/1996 | Sato | 340/2.1 |
| 5,485,040 | A | | 1/1996 | Sutterlin | 307/3 |
| 5,497,142 | A | | 3/1996 | Chaffanjon | 340/310.06 |
| 5,498,956 | A | | 3/1996 | Kinney et al. | 324/142 |
| 4,749,992 | A | | 6/1996 | Fitzmeyer et al. | 340/870.02 |
| 5,533,054 | A | | 7/1996 | DeAndrea et al. | 375/286 |
| 5,537,087 | A | | 7/1996 | Naito | 336/92 |
| 5,559,377 | A | | 9/1996 | Abraham | 307/104 |
| 5,568,185 | A | * | 10/1996 | Yoshikazu | 348/22 |
| 5,579,221 | A | | 11/1996 | Mun | 364/188 |
| 5,579,335 | A | | 11/1996 | Sutterlin et al. | 375/200 |
| 5,592,354 | A | | 1/1997 | Nocentino, Jr. et al. | 361/69 |
| 5,592,482 | A | | 1/1997 | Abraham | 348/8 |
| 5,598,406 | A | | 1/1997 | Albrecht et al. | 370/296 |
| 5,616,969 | A | * | 4/1997 | Morava | 307/91 |
| 5,625,863 | A | | 4/1997 | Abraham | 455/3.3 |
| 5,630,204 | A | | 5/1997 | Hylton et al. | 455/3.3 |
| 5,640,416 | A | | 6/1997 | Chalmers | 375/147 |
| 5,664,002 | A | | 9/1997 | Skinner, Sr. | 379/56.2 |
| 5,684,450 | A | | 11/1997 | Brown | 340/310.02 |
| 5,691,691 | A | * | 11/1997 | Merwin et al. | 340/310.02 |
| 5,694,108 | A | | 12/1997 | Shuey | 340/310.01 |
| 5,705,974 | A | | 1/1998 | Patel et al. | 340/310.08 |
| 5,712,614 | A | | 1/1998 | Patel et al. | 340/310.03 |
| 5,717,685 | A | | 2/1998 | Abraham | 370/30 |
| 5,726,980 | A | | 3/1998 | Rickard | 370/293 |
| 5,748,104 | A | | 5/1998 | Argyroudis et al. | 340/870.11 |
| 5,748,671 | A | | 5/1998 | Sutterlin et al. | 375/206 |
| 5,751,803 | A | | 5/1998 | Shpater | 379/379 |
| 5,770,996 | A | | 6/1998 | Severson et al. | 340/310.08 |
| 5,774,526 | A | | 6/1998 | Propp et al. | 379/90.1 |
| 5,777,544 | A | | 7/1998 | Vander Mey et al. | 340/310.06 |
| 5,777,545 | A | | 7/1998 | Patel et al. | 341/310.06 |
| 5,777,769 | A | | 7/1998 | Coutinho | 359/173 |
| 5,778,116 | A | | 7/1998 | Tomich | 385/16 |
| 5,796,607 | A | | 8/1998 | Le Van Suu | 364/140.01 |
| 5,798,913 | A | | 8/1998 | Tiesinga et al. | 363/21.13 |
| 5,801,643 | A | * | 9/1998 | Williams et al. | 340/870.02 |
| 5,802,102 | A | | 9/1998 | Davidovici | 375/152 |
| 5,805,053 | A | | 9/1998 | Patel et al. | 340/310.01 |
| 5,818,127 | A | | 10/1998 | Abraham | 307/106 |
| 5,818,821 | A | | 10/1998 | Schurig | 370/293 |
| 5,828,293 | A | | 10/1998 | Rickard | 340/310.04 |
| 5,835,005 | A | | 11/1998 | Furukawa et al. | 340/310.01 |
| 5,847,447 | A | | 12/1998 | Rozin et al. | 257/678 |
| 5,856,776 | A | | 1/1999 | Armstrong et al. | 340/310.01 |
| 5,864,284 | A | | 1/1999 | Sanderson et al. | 340/310.01 |
| 5,870,016 | A | | 2/1999 | Shrestha | 340/310.01 |
| 5,880,677 | A | | 3/1999 | Lestician | 340/825.06 |

| | | | | |
|---|---|---|---|---|
| 5,881,098 A | | 3/1999 | Tzou | 375/152 |
| 5,892,430 A | | 4/1999 | Wiesman et al. | 340/310.01 |
| 5,892,758 A | | 4/1999 | Argyroudis | 370/335 |
| 5,929,750 A | | 7/1999 | Brown | 340/310.02 |
| 5,933,071 A | | 8/1999 | Brown | 340/310.01 |
| 5,933,073 A | | 8/1999 | Shuey | 340/310.07 |
| 5,937,003 A | | 8/1999 | Sutterlin et al. | 375/208 |
| 5,937,342 A | | 8/1999 | Kline | 455/402 |
| 5,949,327 A | | 9/1999 | Brown | 340/310.01 |
| 5,963,585 A | | 10/1999 | Omura et al. | 375/207 |
| 5,977,650 A | | 11/1999 | Rickard et al. | 307/3 |
| 5,978,371 A | | 11/1999 | Mason, Jr. et al. | 370/389 |
| 5,982,276 A | | 11/1999 | Stewart | 340/310.01 |
| 5,994,998 A | | 11/1999 | Fisher et al. | 340/310.01 |
| 5,994,999 A | | 11/1999 | Ebersohl | 340/310.01 |
| 6,014,386 A | * | 1/2000 | Abraham | 340/310.01 |
| 6,023,106 A | | 2/2000 | Abraham | 307/3 |
| 6,037,678 A | | 3/2000 | Rickard | 307/89 |
| 6,037,857 A | | 3/2000 | Behrens et al. | 340/310.03 |
| 6,040,759 A | * | 3/2000 | Sanderson | 340/310.01 |
| 6,091,932 A | | 7/2000 | Langlais | 455/5.1 |
| 6,104,707 A | | 8/2000 | Abraham | 370/295 |
| 6,121,765 A | * | 9/2000 | Carlson | 323/359 |
| 6,130,896 A | | 10/2000 | Lueker et al. | 370/469 |
| 6,140,911 A | | 10/2000 | Fisher et al. | 340/310.01 |
| 6,141,634 A | | 10/2000 | Flint et al. | 703/18 |
| 6,144,292 A | | 11/2000 | Brown | 340/310.02 |
| 6,151,330 A | | 11/2000 | Liberman | 370/449 |
| 6,151,480 A | * | 11/2000 | Fischer et al. | 340/310.01 |
| 6,154,488 A | | 11/2000 | Hunt | 375/219 |
| 6,157,292 A | | 12/2000 | Piercy et al. | 340/310.01 |
| 6,172,597 B1 | | 1/2001 | Brown | 340/310.02 |
| 6,175,860 B1 | | 1/2001 | Gaucher | 709/208 |
| 6,177,849 B1 | | 1/2001 | Barsellotti et al. | 333/177 |
| 6,212,658 B1 | | 4/2001 | Le Van Suu | 714/749 |
| 6,226,166 B1 | | 5/2001 | Gumley et al. | 361/118 |
| 6,229,434 B1 | | 5/2001 | Knapp et al. | 340/310.01 |
| 6,239,722 B1 | | 5/2001 | Colton et al. | 340/870.02 |
| 6,243,413 B1 | | 6/2001 | Beukema | 375/222 |
| 6,243,571 B1 | | 6/2001 | Bullock et al. | 455/402 |
| 6,255,805 B1 | | 7/2001 | Papalia et al. | 323/207 |
| 6,255,935 B1 | | 7/2001 | Lehmann et al. | 340/310.07 |
| 6,282,405 B1 | | 8/2001 | Brown | 725/79 |
| 6,297,729 B1 | | 10/2001 | Abali et al. | 340/310.01 |
| 6,297,730 B1 | | 10/2001 | Dickinson | 340/310.01 |
| 6,317,031 B1 | | 11/2001 | Rickard | 340/310.03 |
| 6,331,814 B1 | | 12/2001 | Albano et al. | 340/310.01 |
| 6,335,672 B1 | | 1/2002 | Tumlin et al. | 336/175 |
| 6,373,376 B1 | | 4/2002 | Adams et al. | 340/310.01 |
| 6,396,392 B1 | | 5/2002 | Abraham | 340/310.01 |
| 6,404,773 B1 | | 6/2002 | Williams et al. | 370/463 |
| 6,407,987 B1 | | 6/2002 | Abraham | 370/295 |
| 6,414,578 B1 | | 7/2002 | Jitaru | 336/170 |
| 6,425,852 B1 | | 7/2002 | Epstein | 600/13 |
| 6,441,723 B1 | * | 8/2002 | Mansfield, Jr. et al. | 340/310.01 |
| 6,452,482 B1 | * | 9/2002 | Cern | 340/310.01 |
| 6,486,747 B1 | | 11/2002 | DeCramer et al. | 333/25 |
| 6,496,104 B2 | | 12/2002 | Kline | 340/310.01 |
| 6,504,357 B1 | | 1/2003 | Hemminger et al. | 324/142 |

FOREIGN PATENT DOCUMENTS

| | | |
|---|---|---|
| EP | 0 141 673 A2 | 5/1985 |
| EP | 0 581 351 A1 | 2/1994 |
| EP | 0 632 602 A2 | 1/1995 |
| EP | 0 470 185 B1 | 11/1995 |
| EP | 0 822 721 A2 | 2/1998 |
| EP | 0 913 955 A2 | 5/1999 |
| EP | 0 933 883 A2 | 8/1999 |
| EP | 0 948 143 A2 | 10/1999 |
| EP | 0 959 569 A1 | 11/1999 |
| EP | 1 011 235 A2 | 6/2000 |
| EP | 1 014 640 A2 | 6/2000 |
| EP | 1 043 866 A2 | 10/2000 |
| EP | 1 075 091 A1 | 2/2001 |
| EP | 0 916 194 B1 | 9/2001 |
| EP | 1 011 235 A3 | 5/2002 |
| EP | 1 014 640 A3 | 7/2002 |
| EP | 1 021 866 B1 | 10/2002 |
| ES | 2 122 920 A1 | 12/1998 |
| FR | 2 326 087 | 7/1976 |
| GB | 1 548 652 | 7/1979 |
| GB | 2 101 857 A | 1/1983 |
| GB | 2 293 950 A | 4/1996 |
| GB | 2 315 937 A | 2/1998 |
| GB | 2 331 683 A | 5/1999 |
| GB | 2 335 335 A | 9/1999 |
| GB | 2 341 776 A | 3/2000 |
| GB | 2 342 264 A | 4/2000 |
| GB | 2 347 601 A | 9/2000 |
| JP | 1276933 | 11/1989 |
| NZ | 276741 | 7/1998 |
| WO | 84/01481 | 4/1984 |
| WO | 90/13950 | 11/1990 |
| WO | 92/16920 | 10/1992 |
| WO | 93/07693 | 4/1993 |
| WO | 95/29536 | 11/1995 |
| WO | 98/01905 A1 | 1/1998 |
| WO | 98/33258 A3 | 7/1998 |
| WO | 98/33258 A2 | 7/1998 |
| WO | 98/40980 A1 | 9/1998 |
| WO | 99/59261 | 11/1999 |
| WO | 00/16496 | 3/2000 |
| WO | 00/59076 A1 | 10/2000 |
| WO | 00/60701 A1 | 10/2000 |
| WO | 00/60822 | 10/2000 |
| WO | 01/08321 A1 | 2/2001 |
| WO | 01/08321 | 2/2001 |
| WO | 01/43305 A1 | 6/2001 |
| WO | 01/50625 | 7/2001 |
| WO | 01/50628 | 7/2001 |
| WO | 01/50629 | 7/2001 |
| WO | 01/82497 A1 | 11/2001 |
| WO | 02/054605 A1 | 7/2002 |

OTHER PUBLICATIONS

Dostert, K., "EMC Aspects of High Speed Powerline Communications," Proceedings of the $15^{th}$ International Wroclaw Symposium and Exhibition on Electromagnetic Capability, Jun. 27–30, 2000; Wroclaw, Poland, pp. 98–102.

Piety, R. A., "Intrabuilding Data Transmission Using Power–Line Wiring," Hewlett–Packard Journal, May 1987, pp. 35–40.

Dostert, K., *Powerline Communications,* Ch. 5, pp. 286, 288–292, Prentice Hall PTR, Upper Saddle River, NJ © 2001.

U.S. Appl. No. 60/224,031, filed Aug. 9, 2000.

Power Line Communications Conference entitled, "PLC, A New Competitor in Broadband Internet Access," Dec. 11–12, 2001, Washington, D.C., 60 pages.

Rivkin, S. R., "Co–Evolution of Electric & Telecommunications Networks," *The Electricity Journal,* May 1998, 71–76.

Marketing Assessment Presentation entitled "Powerline Telecommunications," prepared by The Shpigler Group for CITI PLT, Jul. 16, 2002, 9 pages.

Campbell, C., presentation entitled "Building a Business Case for PLC: Lessons Learned From the Communication Industry Trenches," KPMG Consulting, Jul. 16, 2002, 5 pages.

"Embedded Power Line Carrier Modem," Archnet Electronic Technology, http://www.archnetco.com/english/product/ATL90.htm, 2001, 3 pages.
"Archnet: Automatic Meter Reading System Power Line Carrier Communication", www.archnetco.com/english/product/product_sl.htm, 3 pages.
"Power Line Communications Solutions", www.echelon.com/products/oem/transceivers/powerline/default.htm, 2 pages.
"Texas Instruments: System Block Diagrams; Power Line Communication (Generic)", http://focus.ti.com/docs/apps/catalog/resources/blockdiagram.jhtml?bdId=638, 1 page.
Feduschak, N.A., "Waiting in the Wings: Is Powerline Technology Ready to Compete with Cable?", Mar. 2001, www.cabletoday.com/ic2/archives/0301/0301powerline-.htm, 5 pages.
"Signalling on Low–Voltage Electrical Installations in the Frequency Band 3kHz to 148.5kHz–Part 4: Filters at the Interface of the Indoor and Outdoor Electricity Network", *CLC SC 105A* (*Secretariat*) May 1992, 62, 1–11.
"Intellon Corporation Test Summary for Transformerless Coupler Study", *Intellon No News Wires,* Dec. 24, 1998, DOT/NHTSA Order No. DTNH22–98–P–07632, pp. 1–18.
EMETCON *Automated Distribution System,* ABB Power T & D Company, Inc., Jan. 1990, Raleigh, North Carolina, No. B–919A, 14 pages.
"Dedicated Passive Backbone for Power Line Communications", *IBM Technical Disclosure Bulletin,* Jul. 1997, 40(7), 183–185.
Coaxial Feeder Cables [Engineering Notes], *PYE Telecommunications Limited Publication Ref. No. TSP507/1,* Jun. 1975, Cambridge, England, 15 pages.
"Centralized Commercial Building Applications with the Lonworks® PLT–21 Power Line Transceiver", *Lonworks Engineering Bulletin,* Echelon, Apr. 1997, pp. 1–22.
Plexeon Logistics, Inc., "Power Line Communications", www.plexeon.com/power.html, 2 pages.
"EMETCON Automated Distribution System: Communications Guide", *Westinghouse ABB Power T & D Company Technical Manual 42–6001A,* Sep. 1989, 55 pages.
Abraham, K.C. et al., "A Novel High–Speed PLC Communication Modem", *IEEE Transactions on Power Delivery,* 1992, 7(4), 1760–1768.
J.M. Barstow., "A Carrier Telephone System for Rural Service", *AIEE Transactions,* 1947, 66, 301–307.
Chang, S.S.L., "Power–Line Carrier", *Fundamentals Handbook of Electrical and Computer Engineering*, vol. II–Communication, Control, Devices and Systems, John Wiley & Sons, 617–627.
Chen, Y–F. et al. "Baseband Transceiver Design of a 128–Kbps Power–Line Modem for Household Applications", *IEEE Transactions on Power Delivery,* 2002, 17(2), 338–344.
Coakley, N.G. et al., "Real–Time Control of a Servosystem Using the Inverter–Fed Power Lines to Communicate Sensor Feedback", *IEEE Transactions on Industrial Electronics,* 1999, 46(2), 360–369.
Esmailian, T. et al., "A Discrete Multitone Power Line Communication System", *Department of Electrical and Computer Engineering,* University of Toronto, Ontario Canada, 2000 IEEE, pp 2953–2956.
Kawamura, A. et al., "Autonomous Decentralized Manufacturing System Using High–speed Network with Inductive Transmission of Data and Power", *IEEE,* 1996, 940–945.
Kilbourne, B. "EEI Electric Perspectives: The Final Connection", www.eei.org/ep/editorial/Jul–01/0701conenct.htm, 7 pages.
Kim, W–O., et al., "A Control Network Architecture Based on EIA–709.1 Protocol for Power Line Data Communications", *IEEE Transactions on Consumer Electronics,* 2002, 48(3), 650–655.
Lim, C.K. et al., "Development of a Test Bed for HighSpeed Power Line Communications", School of Electrical and Electronic Engineering, Nanyang Technological University, Singapore, *IEEE,* 2000, 451–456.
Lokken, G. et al., "The Proposed Wisconsin electric Power Company Load Management System Using Power Line Carrier Over Distribution Lines", *1976 National Telecommunications Conference, IEEE,* 1976, 2.2–12.2–3.
Marthe, E. et al., "Indoor Radiated Emission Associated with Power Line Communication Systems", *Swiss Federal Institute of Technology Power Systems Laboratory IEEE,* 2001, 517–520.
Naredo, J.L. et al., "Design of Power Line Carrier Systems on Multitransposed Delta Transmission Lines", *IEEE Transactions on Power Delivery,* 1991, 6(3), 952–958.
Nichols, K., "Build a Pair of Line–Carrier Modems", *CRC Electronics–Radio Electronics,* 1988, 87–91.
Okazaki, H, et al., "A Transmitting, and Receiving Method for CDMA Communications Over Indoor Electrical Power Lines", *IEEE,* 1998, pp VI–522–VI–528.
B. Don Russell, "Communication Alternatives for Distribution Metering and Load Management", *IEEE Transactions on Power Apparatus and Systems,* 1980, vol. PAS–99(4), pp 1448–1455.
Sado, WN. et al., "Personal Communication on Residential Power Lines—Assessment of Channel Parameters", *IEEE,* 532–537.
International Search Report dated Aug. 7, 2002, from PCT/US02/04300.
Patent Abstracts of Japan, Japanese Publication No. 10200544 A2, published Jul. 31, 1998, (Matsushita Electric Works, LTD).
Web Printout: http://www.tohoku–epco.co.jp/profil/kurozu/c_vol8_1/art04.htm Tohoku Electric Power, Co., Inc., "Tohoku Electric Develops High–Speed Communications System Using Power Distribution Lines," *Tohoku Currents,* Spring 1998, 8(1), 2 pages.
International Search Report issued in PCT Application No. PCT/US01/01810, Date of Mailing: May 2, 2001.
International Search Report issued in PCT Application No. PCT/US01/12699, Date of Mailing: Jul. 16, 2001.
International Search Report issued in PCT Application No. PCT/US01/12291, Date of Mailing: Oct. 22, 2001.
International Search Report issued in PCT Application No. PCT/US01/48064, Date of Mailing: Jun. 5, 2002.
Written Opinion issued in PCT Application No. PCT/US01/12699, Date of Mailing: May 15, 2002.
International Search Report issued in PCT Application No. PCT/US02/04310, Date of Mailing: Jun. 24, 2002.
LONWORKS Engineering Bulletin, "Demand Side Management with LONWORKS® Power Line Transceivers," Dec. 1996, 36 pages.
HomePlug™Powerline Alliance, HomePlug Initital Draft Medium Interface Specification, May 19, 2000, 109 pages.
HomePlug™Powerline Alliance, HomePlug 0.5 Draft Medium Interface Specification, Nov. 28, 2000, 133 pages.

HomePlug™Powerline Alliance, HomePlug Initital Draft Medium Interface Specification, Jul. 27, 2000, 109 pages.
HomePlug™Powerline Alliance, HomePlug 1.01 Specification, Dec. 1, 2001, 139 pages.
Summary of an IEEE Guide for Power–Line Carrier Applications, A Report by the Power System Communications Committee, *IEEE Transactions on Power Apparatus and Systems,* vol. PAS–99, No. 6, Nov./Dec. 1980.
De Wilde, W. R. et al., "Upwards to a Reliable Bi–Directional Communication Link on the LV Power Suppliers for Utility Services: Field Tests in Belgium," pp. 168–172.
Tanaka, M., "Transmission Characteristics of a Power Line Used for Data Communications at High Frequencies," IEEE Transactions on Consumer Electronics, Feb. 1989, vol. 35, No. 1, pp. 37–42.
Hasler, E. F. et al., "Communication Systems Using Bundle Conductor Overhead Power Lines," IEEE Transactions on Power Apparatus and Systems, Mar./Apr. 1975, vol. PAS–94, No. 2, pp. 344–349.
IEEE Guide for Power–Line Carrier Applications, ANSI/IEEE Std 643–1980, © 1980 by The Institute of Electrical and Electronics Engineers, Inc., pp. 1–80.
Hatori, M. et al., "Home Informatization and Standardization of Home Bus," IEEE Transactions on Consumer Electronics, Aug. 1986, vol. CE–32, No. 3, pp. 542–549.
Hunt, J. M. et al., "Electrical Energy Monitoring and Control System for the Home," IEEE Transactions on Consumer Electronics, Aug. 1986, vol. CE–32, No. 3, pp. 578–583.
Gutzwiller, F. W. et al., "Homenet: A Control Network for Consumer Applications," IEEE Transactions on Consumer Electronics, Aug. 1983, vol. CE–29, No. 3, pp. 297–304.
Burrascano, P. et al., "Digital Signal Transmission on Power Line Carrier Channels: An Introduction," IEEE Transactions on Power Delivery, Jan. 1987, vol. PWRD–2, No. 1, pp. 50–56.
Burr, A. G. et al., "Effect of HF Broadcast Interference on PowerLine Telecommunications Above 1 Mhz," © 1998 IEEE, pp. 2870–2875.
Onunga, J. et al., "Distribution Line Communications Using CSMA Access Control with Priority Acknowledgements," IEEE Transactions on Power Delivery, Apr. 1989, vol. 4, No. 2, pp. 878–886.
Tanaka, M., "High Frequency Noise Power Spectrum, Impedance and Transmission Loss of Power Line in Japan on Intrabuilding Power Line Communications," IEEE Transactions on Consumer Electronics, May 1988, vol. 34, No. 2, pp. 321–326.
Meng, H. et al., "A Transmission Line Model for High–Frequency Power Line Communication Channel," © 2002 IEEE, pp. 1290–1295.
Burrascano, P. et al., "Performance Evaluation of Digital Signal Transmission Channels on Coronating Power Lines," © 1988 IEEE, pp. 365–368.
DiClementi, D. A. et al., "Electrical Distribution System Power Line Characterization," © 1996 IEEE, pp. 271–276.
Abraham, K. C. et al., "A Novel High–Speed PLC Communication Modem," IEEE Transactions on Power Delivery, Oct. 1992, vol. 7, No. 4, pp. 1760–1768.
Yoshitoshi, M. et al., "Proposed Interface Specifications for Home Bus," IEEE Transactions on Consumer Electronics, Aug. 1986, vol. CE–32, No. 3, pp. 550–557.
O'Neal, Jr., J. B., "The Residential Power Circuit as a Communication Medium," IEEE Transactions on Consumer Electronics, Aug. 1986, vol. CE–32, No. 3, pp. 567–577.
Written Opinion dated Aug. 20, 2003, from PCT/US02/04310.
Written Opinion dated Mar. 21, 2003, from PCT/US02/04300.

* cited by examiner

NON-INTRUSIVE COUPLING TO SHIELDED POWER CABLE

CROSS-REFERENCE TO RELATED APPLICATION

This application claims priority under 35 U.S.C. § 119 (e) from provisional application No. 60/224,031, filed Aug. 9, 2000, which is incorporated by reference herein in its entirety.

TECHNICAL FIELD

The invention relates generally to non-intrusively coupling to shielded power cables. More specifically, the invention relates to coupling to power cables for the purpose of allowing the power cable to act as a data transmission medium.

BACKGROUND OF THE INVENTION

Transmitting data to end users has become the main focus of many technologies. Data networks provide the backbone necessary to communicate the data from one point to another. Of course, using existing networks, like the telecommunication networks, provides the benefit of not having to run new cables, which can create a great expense. On the other hand, using existing networks requires that the components that help carry the data conform to the requirements of the existing networks.

One particular existing network that recently has been used to carry data is the electrical power system. This system has the advantage of providing an existing connection to every customer premise. The electrical power distribution network includes many various divisions and subdivisions. Generally, the electric power system has three major components: the generation facilities that produce the electric power, the high-voltage transmission network that carries the electric power from each generation facility to distribution points, and the distribution network that delivers the electric power to the consumer. Generally, substations act as the intermediary between the high-voltage transmission network and the medium and low voltage distribution network. The substations typically provide the medium voltage to one or more distribution transformers that feed the customer premises. Distribution transformers may be pole-top transformers located on a telephone or electric pole for overhead distribution systems, or pad-mounted transformers located on the ground for underground distribution systems. Distribution transformers act as distribution points in the electrical power system and provide a point at which voltages are stepped-down from medium voltage levels (e.g., less than 35 kV) to low voltage levels (e.g., from 120 volts to 480 volts) suitable for use by residential and commercial end users.

The medium and low voltage networks of the electrical power system have been used to establish a data network among the end users. In particular, the medium voltage network acts as an interface between centralized data servers and the low voltage network that connect to the end users. In order to obtain the advantages of using this existing network for transmitting data, however, certain constraints inherent with every power distribution system must be overcome. For example, any connections made between the medium and low voltage networks, outside of the usual and protected transformer interfaces, create concern for the safety of individuals and equipment brought about by the possibility of placing medium voltage levels on the low voltage network. Moreover, the difficulty of providing power to the equipment necessary to network the end user with the medium voltage network must be considered.

Therefore, it would be advantageous to a technique for safely and effectively permitting the power distribution system to transmit data.

SUMMARY OF THE INVENTION

The invention describes a method and a device, for transporting a signal over a power line. The inventive method includes inducing an alternating current (AC) voltage from the power line, powering a transceiver device with the induced alternating current (AC) voltage, communicating the signal with the transceiver device via the power line. The method further may include transmitting and/or receiving the signal with an end user via the transceiver device. The transceiver device may be a fiber optic-based device that transmits data to the end user over non-metallic fiber optic links. The method may filter the induced AC voltage, and separately filter the signal.

The invention further includes a device for transporting a signal over a power line. The inventive device includes at least one ferrite core located on an outer insulator of the power line. The ferrite core acts to increase an inductance of the power line. The device further includes a transformer device (e.g., a current transformer) located on an outer insulator of the power line. The transformer device induces an AC voltage from the power line. The device further includes a transceiver that receives power from the transformer device, and that receives the signal from a conductor external to the center conductor. The device may further include an enclosure for housing the ferrite core, the transformer device, and the transceiver device. The enclosure may serve to provide a ground potential by attaching to the power line at a predetermined distance from a gap in the outer insulator of the power line. The transceiver may be a fiber optic transceiver that is coupled to the external conductor via the gap in the outer insulator of the power line. The transceiver also may convert the AC power to a direct current (DC) power. The inventive device may include a low-pass filter for filtering the AC power provided by the transformer device, and a high-pass filter for filtering the signal provided via the external conductor. Both the low-pass and high-pass filter functionality may be incorporated within the transceiver device.

BRIEF DESCRIPTION OF THE DRAWINGS

Other features of the invention are further apparent from the following detailed description of the embodiments of the invention taken in conjunction with the accompanying drawings, of which.

DETAILED DESCRIPTION OF THE INVENTION

Power-Based Communication System Overview

Figure 1:
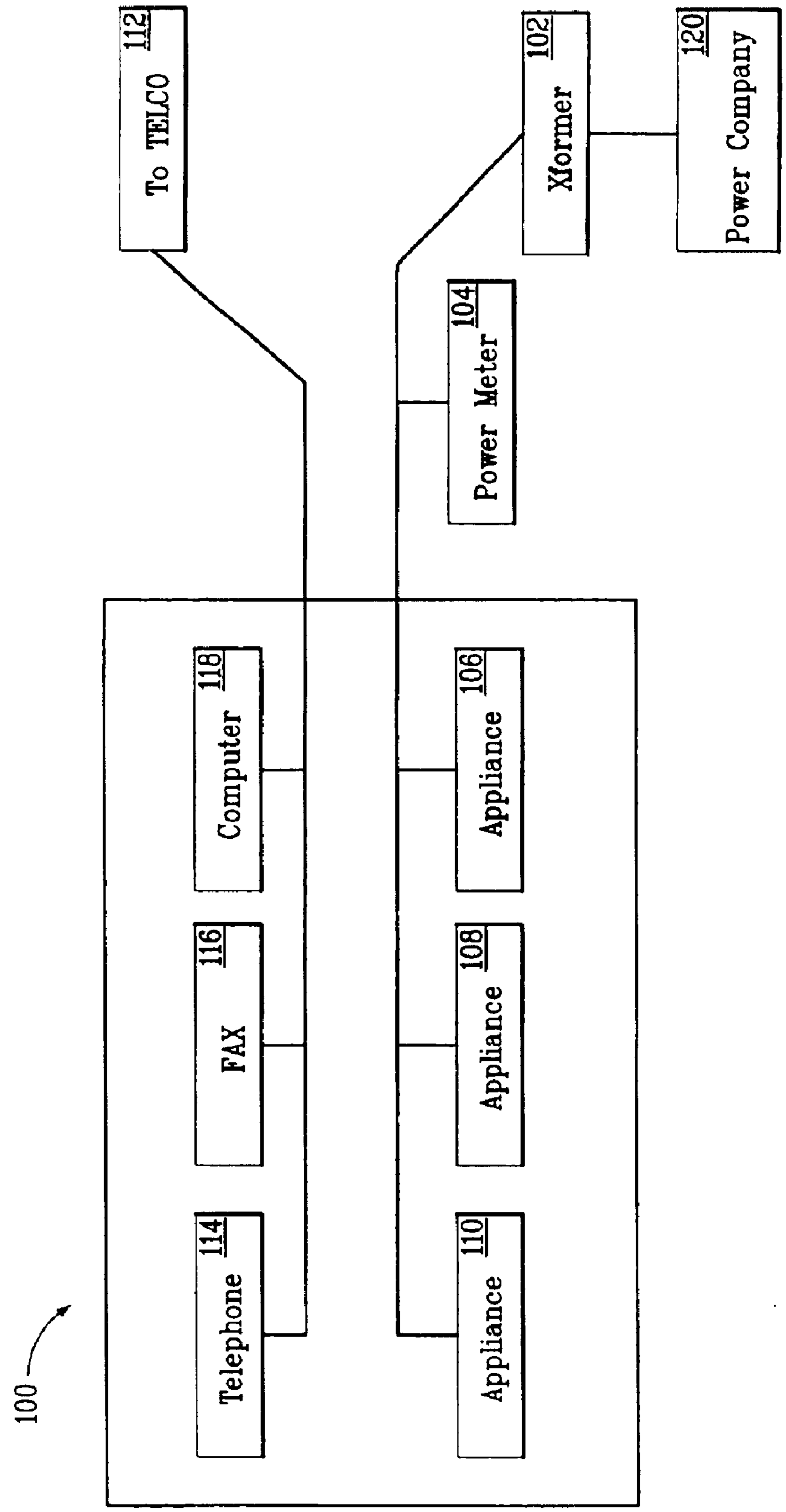
FIG. 1 is a block diagram of a typical electrical power system-based communication system.

FIG. 1 is a block diagram of a typical electrical power system-based communication system 100. It should be appreciated that system 100 may include numerous other components, well known to those skilled in the art. However, the components depicted in system 100 and shown for the purposes of clarity and brevity, while providing a proper context for the invention.

As shown in FIG. 1, a power company 120 distributes power over its network to a power transformer 102. Power transformer 102 can serve several end users. Power transformer 102 provides stepped-down voltage to an electric power meter 104, which may be located with the end user. Power meter 102 is coupled to various appliances 106,108, and 110, which may represent any type of residential, commercial or industrial electrical equipment. Also, a telephone company 112 provides telecommunication wiring over its network directly to the end user. The telecommunication wiring may be in communication with various devices, including a telephone 114, a facsimile machine 116, and/or a computing device 118. Therefore, FIG. 1 provides an overview of the two separate systems or networks (i.e., telecommunications system and power system) that serve to a residential, commercial or industrial end user.

Figure 2:
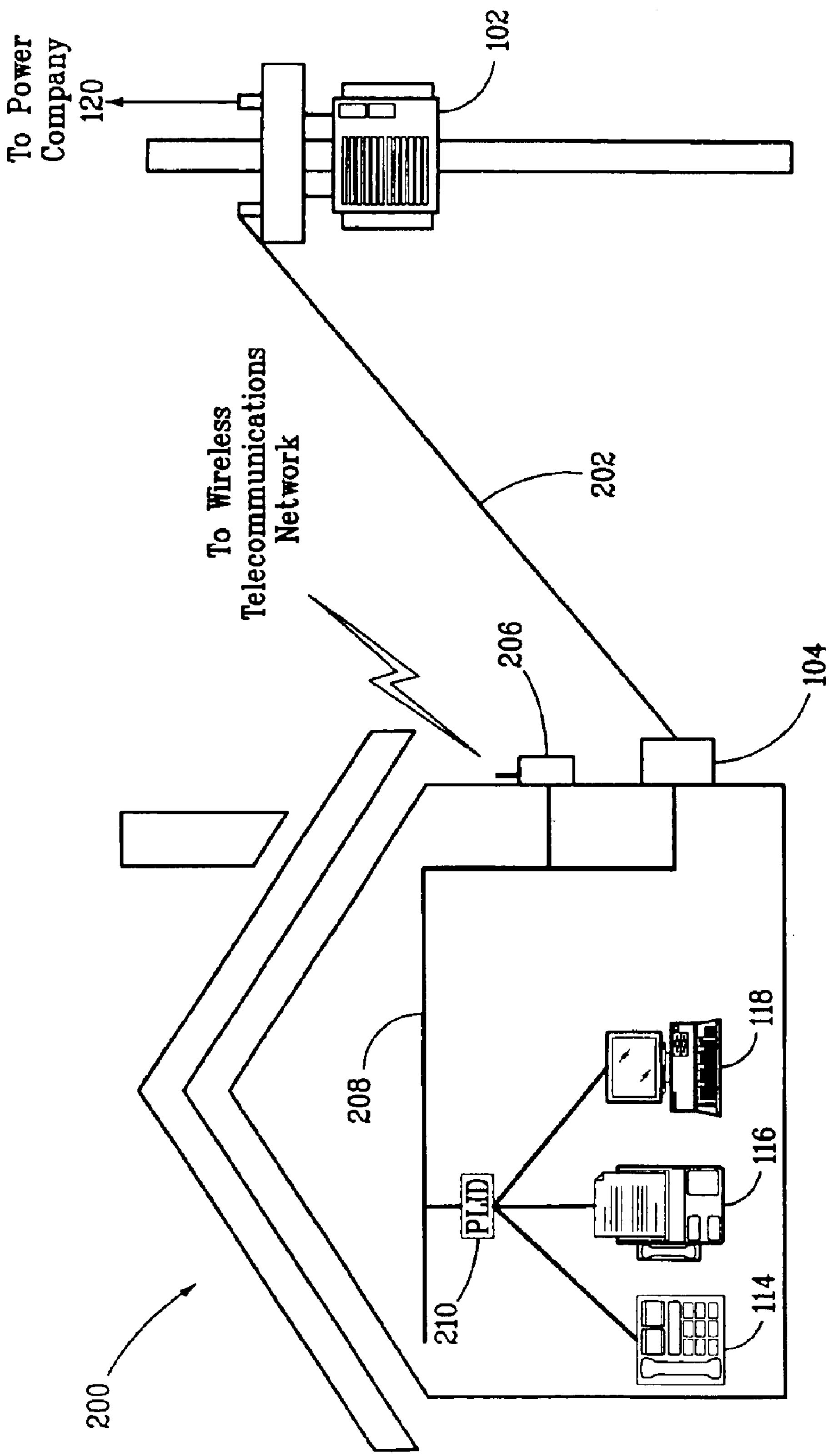
FIG. 2 is a block diagram of a communication system using an electric power system to transfer data.

FIG. 2 is a block diagram of a communication system using an electric power system to transfer data. Although the communication system may include numerous other components, well known to those skilled in the art, the system depicted in FIG. 2 is shown for the purposes of clarity and brevity, while providing a proper context for the invention.

As shown in FIG. 2, power company 120 delivers electrical power (typically in the several kilovolt range) to a power transformer 102. Power transformer 102 steps the voltage level down (e.g., to approximately 110 volts or 120 volts) as required and provides power over power line 202 to a power meter 104. Also, power transformer 102 provides electrical isolation characteristics. Power is provided from power meter 104 to the residential, commercial or industrial end user via internal power wiring 208. A power line interface device (PLID) 210 is in communication with internal power wiring 208. Currently, internal power wiring 208 for a home or business, for example, typically supports data rates of up to 100 kilobits per second with $1^{-9}$ bit error rate (BER).

PLID 210 provides an interface for plain old telephone service (POTS), and data through for example a RS-232 port or Ethernet connection. Therefore, an end user may use PLID 210 to communicate data over power line 202, via internal power wiring 208, using telephone 114, facsimile machine 116 and/or computer 118, for example. Although not shown in FIG. 2, it should be appreciated that a user can have multiple PLID's within any particular installation.

Figure 3:
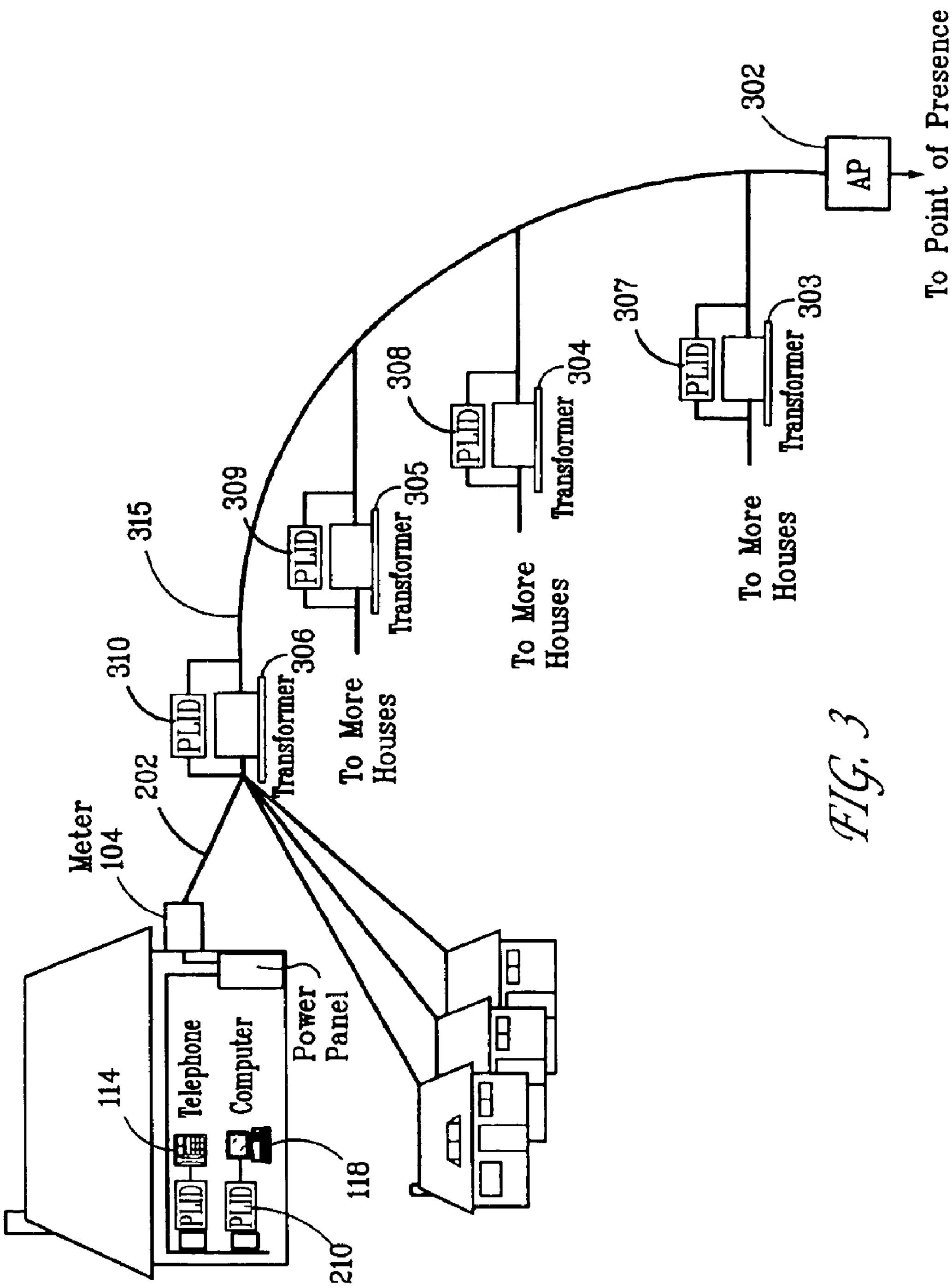
FIG. 3 provides a basic block diagram of the components necessary to connect the medium voltage portion of the system with the low voltage portion.

The connection between power company 120 and power transformer 102 carries medium voltage levels. This portion of the power system has the least amount of noise and least amount of reflections, and therefore has the greatest potential bandwidth for communications. Of course, the low voltage portion of the system must be accessed to interface with the end users. FIG. 3 provides a basic block diagram of the components necessary to connect the medium voltage portion of the system with the low voltage portion.

As shown in FIG. 3, a series of power transformers 303–306 connect various end users to a point of presence 301 via an aggregation point (AP) 302. AP 302 communications to centralized servers (e.g., the Internet) via a Point of Presence 301 (POP). POP 301 may be a computing device capable of communicating with a centralized server on the Internet, for example. The connection between POP 301 and AP 302 can be any type of communication media including fiber, copper or a wireless link.

Each power transformer 303–306 has an associated Power Line Bridge 307–310 (PLB). PLBs 307–310 provide an interface between the medium voltage on the primary side of the transformer with the low voltage on the secondary side of the transformer. PLBs 307–310 communicate with their respective PLIDs (e.g., PLID 210 and PLB 310) located on the low voltage system. PLBs 307–310 employ MV couplers that prevent the medium voltage from passing to the low voltage side of the system via PLB's 307–310, while still allowing communication signals to be transported between the low voltage and medium voltage systems. The medium voltage couplers therefore provide the necessary isolation traditionally provided by power transformers 303–306. The invention is directed at a novel technique for transporting signals between the medium voltage system and the end users.

Prior Art Coupling Techniques

Figure 4:
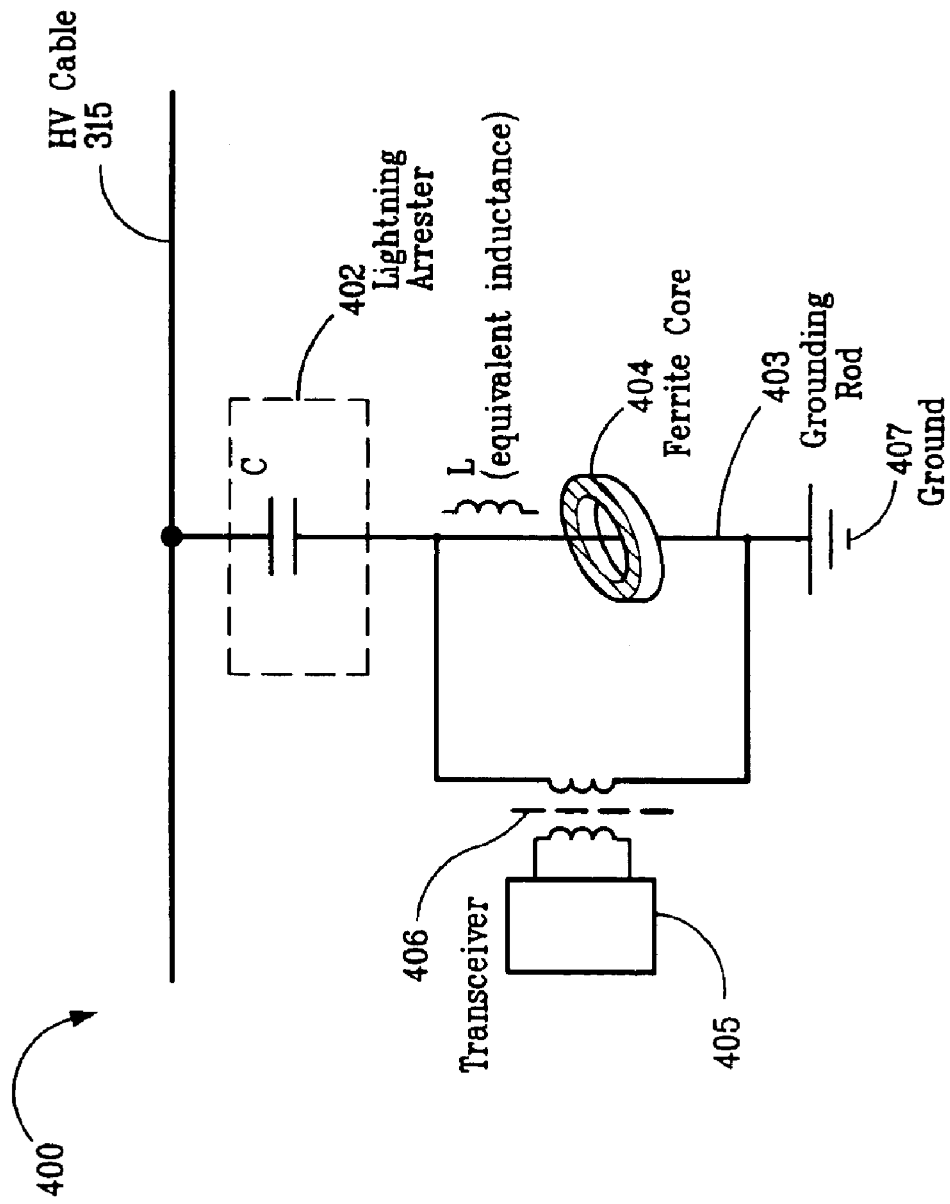
FIG. 4 illustrates a prior art coupling technique.

FIG. 4 is a circuit diagram of a prior art coupling system 400. As shown in FIG. 4, a high-voltage cable 315 is connected to a lightning arrester 402. The term "high-voltage" will be used throughout to describe voltage levels on an electric power system that are higher than typically provided to the end user. The term "low-voltage" will be used throughout to describe voltage levels on an electric power system that are provided to the end user. Lightning arrester 402 is connected to a ground potential 407 by means of a grounding rod 403. The connection between high-voltage cable 315 and ground potential 407 has a certain inductance value that may be increased by placing a ferrite core 404 around grounding rod 403. Also, in practice, lightning arrester 402 typically has a capacitance value in a range of 1 to 170 picofarads (pf) (as will be discussed with reference to FIG. 5). A transformer device 406 is connected in parallel with grounding rod 403 and across ferrite core 404. Transformer device 406 provides acts to communicate a data signal from high-voltage cable 315 to and from transceiver 405, while providing the necessary isolation from the high voltage carried by high-voltage cable 315. Transceiver unit 405 takes the data signal provided via transformer 406 and transmits and receives data signals from an end user (not shown) or a data server (not shown).

The prior art technique shown in FIG. 4 suffers from many inherent problems. First, although not shown in FIG. 4, a lightning arrester device must be installed on both ends of high-voltage cable 315, thus adversely affecting the real and reactive power components provided by high-voltage cable 315. Second, the capacitive value of the lightning arrester must be close to the high end of the available range (e.g., 170 pf) rather than to the low end of the range (e.g., 1 pf) so as to ensure that a sufficient signal over a wide frequency band is provided to transceiver 405 (as discussed further with reference to FIG. 5). Third, system 400 represents a dual-pole RLC circuit, and thus exhibits significant signal degradation over each frequency interval, a large as compared to a signal pole circuit.

Figure 5:
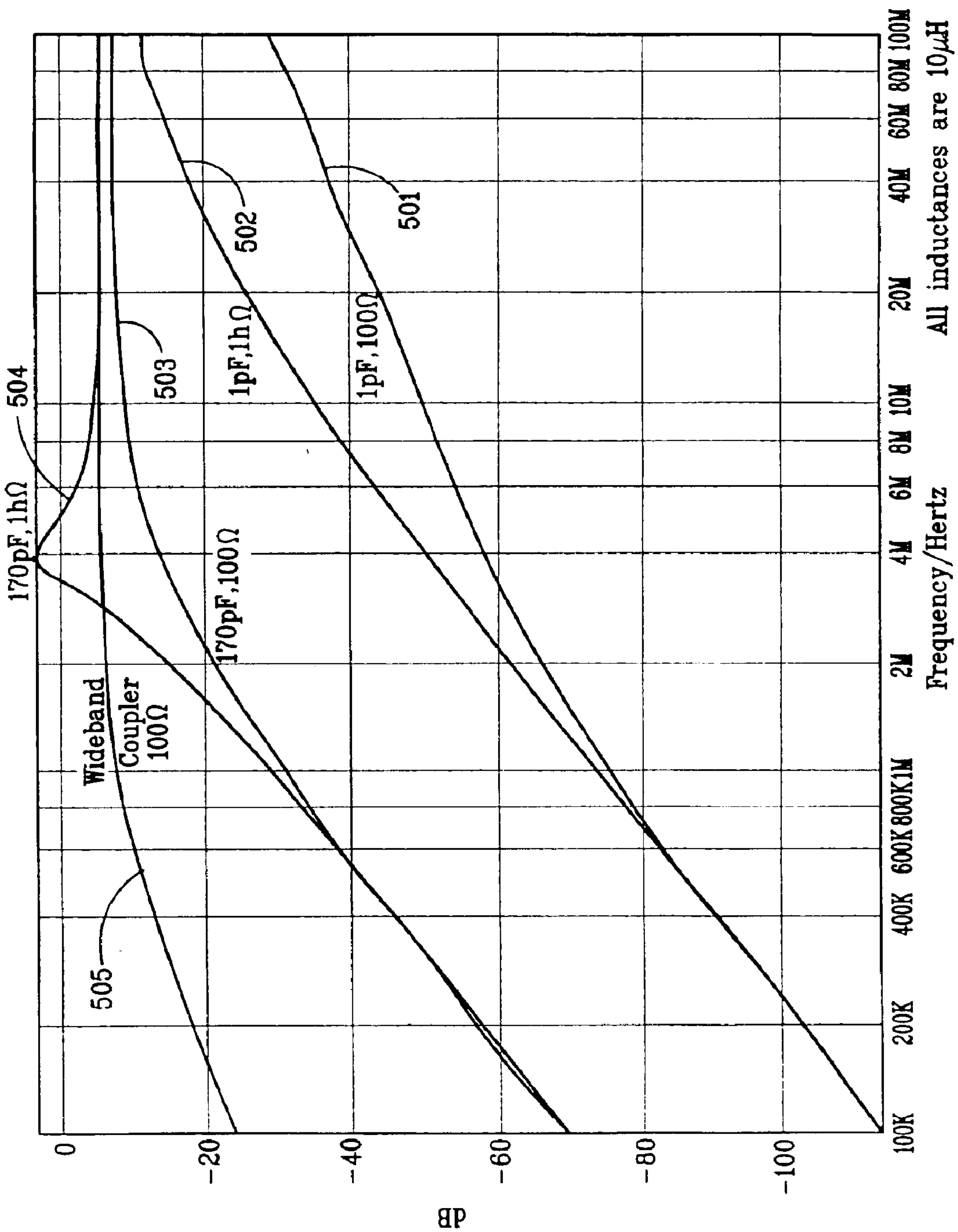
FIG. 5 illustrates a graphical comparative simulation between the coupling technique of FIG. 1 and the coupling technique according to an embodiment of the invention.

FIG. 5 provides the graphical results of SPICE (Simulation Program With Integrated Circuit Emphasis) simulation of system 100. FIG. 5, illustrates the limitations of the signal in the frequency domain in the prior art, as compared to the invention. In particular, FIG. 5 illustrates the attenuation (dB) of a signal over a range of frequencies (Hz) received by transceiver 106 for various capacitive and resistive values that may be provided in system 100, and therefore further illustrates the above-mentioned limitations in the prior art. For lines 501–505, a signal source with a 50 ohm internal resistance is provided on the high-voltage cable 315. Also, the inductive value for system 100 is set at 10 microhenries.

Graphical line 501 illustrates a capacitive value of 1 pf and a resistive value of 100 ohms. Graphical line 502 illustrates a capacitive value of 1 pf and a resistive value of 1 kiloohm. Graphical line 503 illustrates a capacitive value of 170 pf and a resistive value of 100 ohms. Graphical line 504 illustrates a capacitive value of 100 pf and a resistive value of 1 kiloohm. As will be discussed in greater detail, graphical line 505 illustrates the attenuation for frequencies passed by the techniques of the invention. Graphical line 505 is depicted in FIG. 5 for the purpose of comparison with lines 501–504. Notably, graphical line 505 permits a wider range of frequencies to pass with less attenuation than graphical lines 501–504, over most of the frequencies.

As shown in FIG. 5, each of lines 501–502 indicate that system 100 causes a large attenuation for frequencies that are less than 600 kHz. In fact, lines 501–502 causes a greater attenuation than line 505 over the entire range of frequencies depicted in FIG. 5. Accordingly, when system 100 uses capacitive values at the lower end of the available range (e.g., 1 pf), attenuation of the signals is great and therefore undesirable. Similarly, for line 503–504, where the capacitive values are on the higher end of the range (e.g., 100 pf), attenuation is great. Moreover, although line 504 (170 pf and 1 kiloohm) provides less attenuation over a narrow range of frequencies, line 505 may be more beneficial for providing a better or equal attenuation over a wider range of frequencies. Accordingly, neither high nor low values for system 100 will ensure a uniform coupling in a wide frequency band. Also, as depicted with line 504 at a frequency of 4 MHz, system 100 may exhibit resonant behavior at high coupling coefficients. These variations in the frequency domain can distort the data signal, or at least require additional design considerations for system 100 including transceiver 405, for example. Furthermore, comparing lines 501–504 with line 505 indicates that the dual-pole nature of the prior art circuit leads to a faster rate of coupling decay at lower frequencies. For example, as shown in FIG. 5, from 100 kHz to approximately 2 MHz, lines 501–504 exhibit a 12 dB/octave. This is to be distinguished from the 6 dB/octave decay in line 505 representing the invention's single-pole characteristics.

Figure 6:
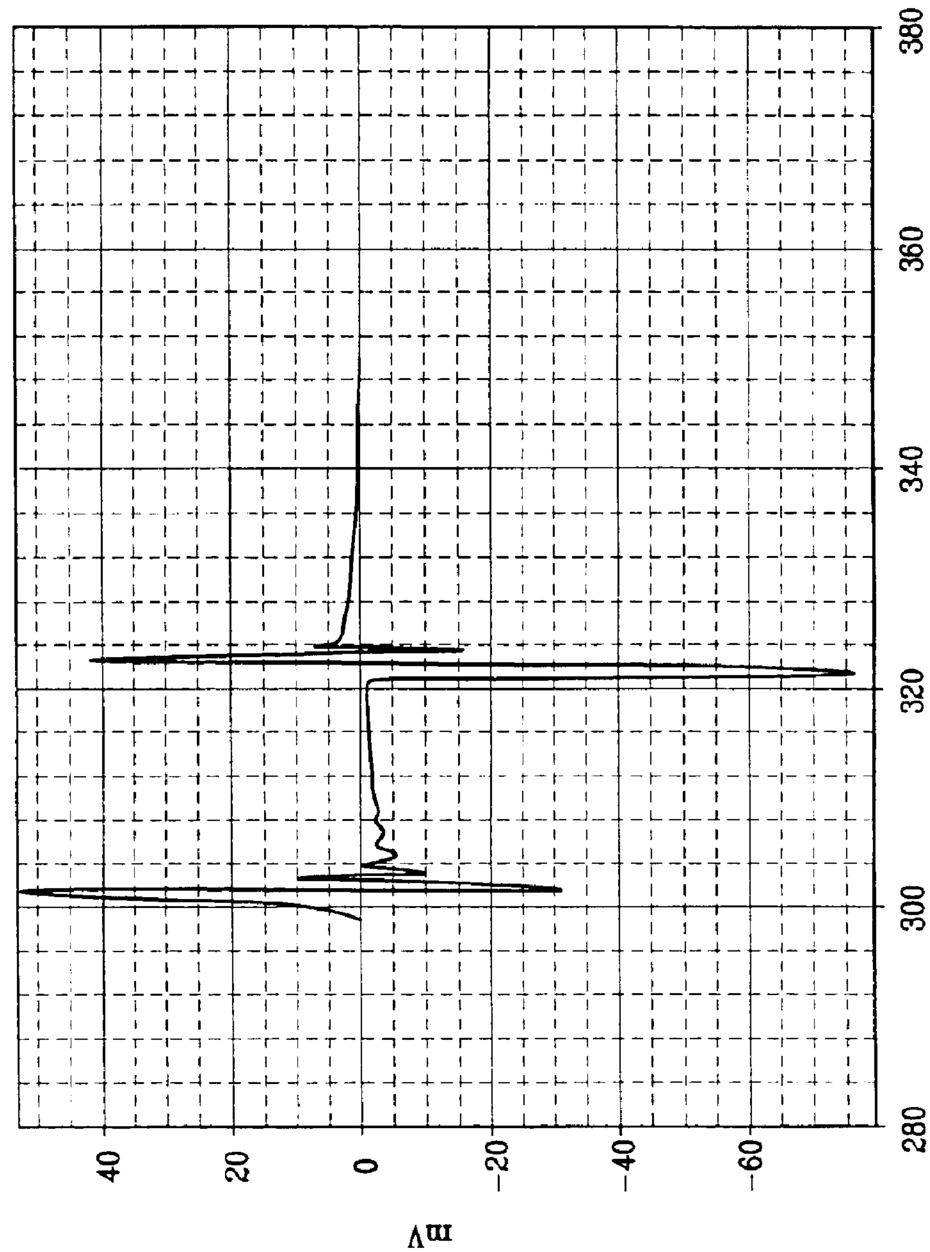
FIG. 6 illustrates pulse transmission with low capacitance of a prior art lightning arrestor, according to the invention.

FIG. 6 further illustrates the inadequacy of prior art system 100 by providing a graphical representation of one of prior art lines 501–504 in the time domain (as compared to FIG. 5's depiction in the frequency domain). In particular, FIG. 6 provides a depiction of the distortion that system 100 causes to a rectangular pulse with a 1 volt and a 100 nanosecond (ns) duration. As shown in FIG. 6, even with a generous grounding-rod inductance of 1 microfarad ($\mu$F); the inputted rectangular pulse is significantly distorted. As will be discussed with reference to FIG. 10, the invention provides much less attenuation of the inputted signal.

Finally, because lightning arrester 102 and the grounding rod 103 are connected directly to high-voltage cable 315, any surge appearing on high-voltage line 315 (e.g., a fault caused by lightning) likely will damage transceiver 105.

Non-Intrusive Coupling

Figure 7:
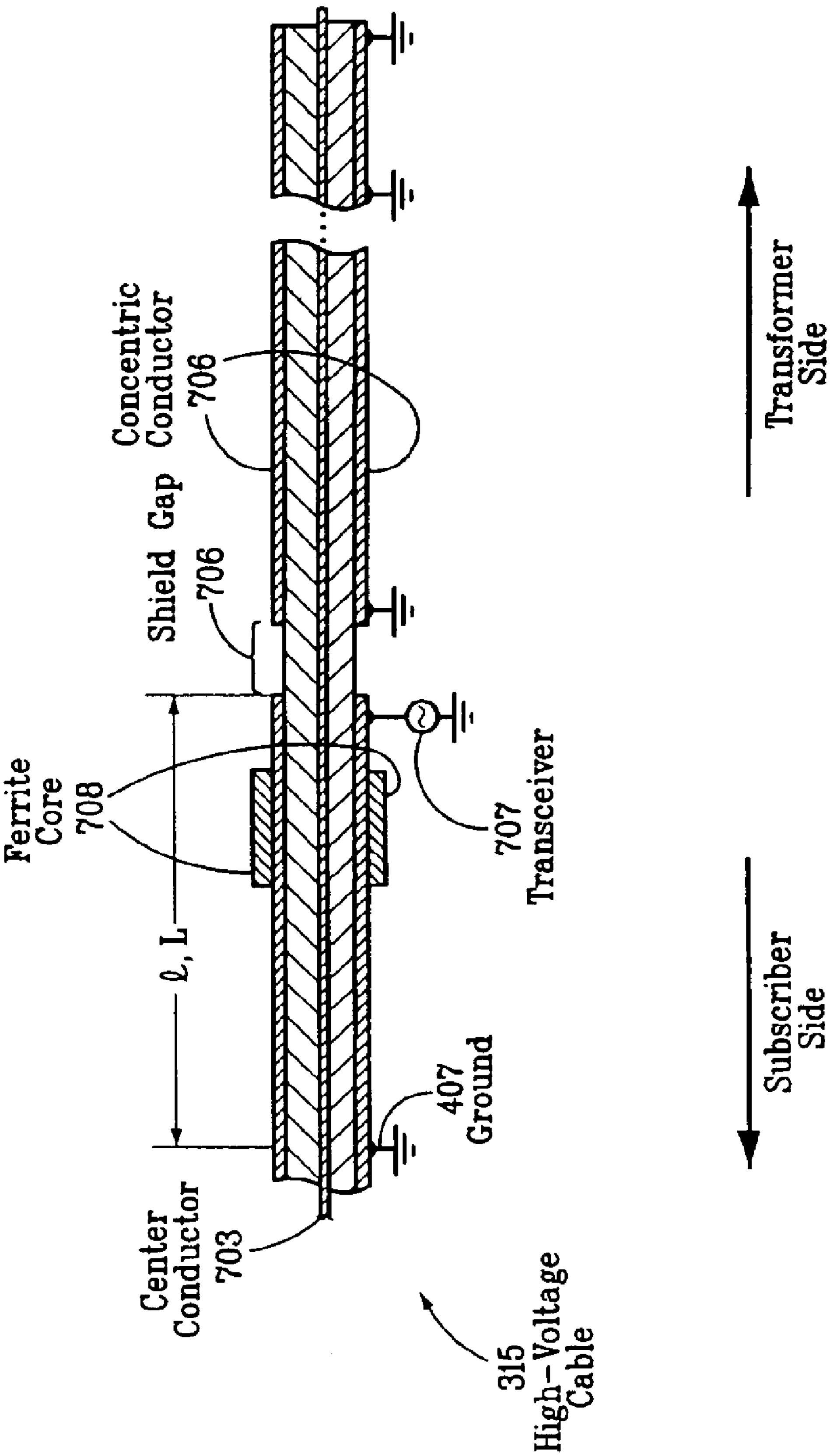
FIG. 7 is a diagram of a coupler technique, according to the invention.

FIG. 7 is a diagram of a coupler technique, according to the invention. In particular, FIG. 7 provides a conceptual diagram of a method for coupling a data transceiver to an electrical power line.

High-voltage cable 315 is shown in FIG. 7. High-voltage cable may be a commercially available distribution cable, for example a 15 kV underground feeder available from Okonite, model Okoguard URO. High-voltage cable 315 has a center conductor 703. Center conductor 703 typically is a stranded aluminum conductor with a rating capable of carrying current at medium voltage levels. Center conductor 703 has one or more insulative covers (not shown). The insulation on center conductor 703 is surrounded by a concentric conductor 704. Concentric conductor 704 typically is found on underground distribution feeders, but also may be found on certain overhead distribution feeders. Concentric conductor 704 typically does not carry high voltage, but acts as a shield to reduce the inductance caused by center conductor 703. Concentric conductor 704 also may act to carry the neutral current back to the power source. Concentric conductor 704 is surrounded by an outer insulating sleeve (not shown). The outer insulating sleeve provides protection and insulative properties to high-voltage cable 315. High-voltage cable 315 is assumed to be AC-terminated at its ends.

In accordance with the invention, high-voltage cable 315 may be modified to facilitate the use of high-voltage cable 315 in carrying desired data signals. In particular, a shield gap 706 has been cut in concentric conductor 704 around the entire periphery of high-voltage cable 315. Shield gap 706 effectively divides concentric conductor 704 into two parts. In addition, a transceiver 707 is in communication with high-voltage cable 315 by a connection to concentric conductor 704. It should be appreciated that transceiver 707 may be a fiber-optic transceiver (as will be discussed further with reference to FIG. 6), capable of receiving and transmitting any type of data signal (e.g., radio frequency signals).

The terms "subscriber side" and "transformer side" will be used throughout to describe the two sides of high-voltage cable 315 relative to shield gap 706. Subscriber side will be used to describe the portion of high-voltage cable 315 to which transceiver 707 is coupled. This is consistent with the fact that the subscriber (i.e., end user) is in communication with transceiver 707. Transformer side will be used to describe the portion of high-voltage cable 315 to which transceiver 707 is not coupled. This is consistent with the fact that the pole-top or pad-mount transformer is coupled to the transformer side of high-voltage cable 315.

The ground connection 107 (along with other ground connections along the length of high-voltage cable 315 is provided at a distance 1 from the subscribe side of shield gap 706. High-voltage cable 315 has an inductance that depends on the distance 1 from ground, as well as other characteristics of high-voltage cable 315 (e.g., diameter and distance from ground plane). Inductance L performs a function similar to the inductance of grounding rod 103 described with reference to FIG. 1. In particular, in order to decrease the attenuation of low-frequency signals by coupling technique, inductance L may be increased. Increasing inductance L may be accomplished by placing additional ferrite cores 708 along the length of high-voltage cable 10.

However, a more complete discussion of the placement of the grounding and inductive means is beyond the scope of the invention.

The length distance 1 should not be significantly longer than a quarter-wavelength at the highest frequency in the transmission band, so as to prevent any resonant behavior that may increase transmission attenuation. Because the input reactance of the high-voltage cable 315 is proportional to its characteristic impedance, increasing the impedance as much as practically possible ensures low attenuation at the low end of the frequency band. This is further ensured by using a relatively high ratio of the outer and inner diameters of high-voltage cable 315, as well as by using ferrite cores 708 with high relative permeance (e.g., 8 maxwell/gilbert).

Figure 8:
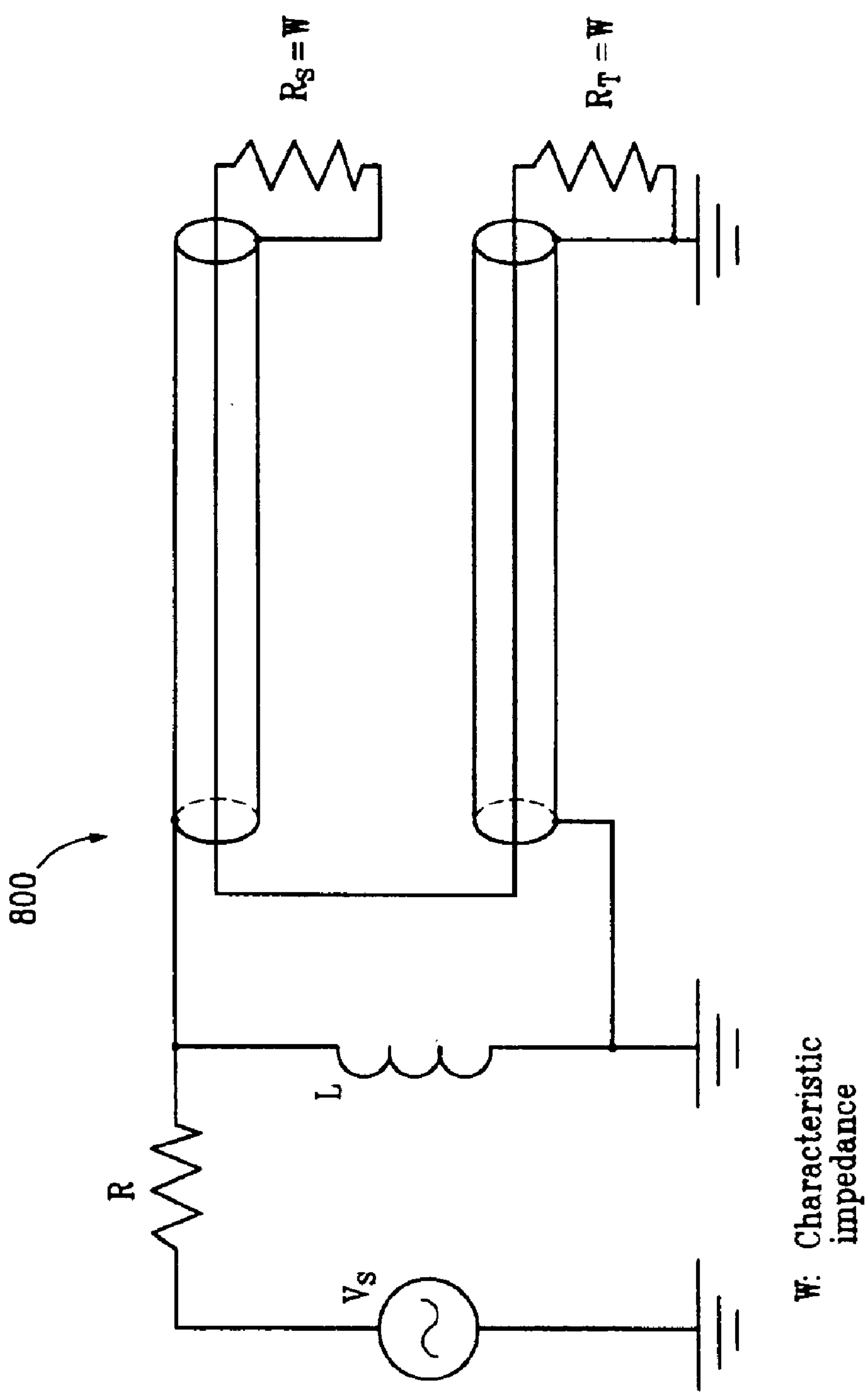
FIG. 8 is an equivalent circuit coupler technique of FIG. 4, according to the invention.

FIG. 8 is a circuit diagram 800 representing the salient properties of the components depicted in FIG. 7. As shown in FIG. 8, the subscriber side and transformer side of high-voltage cable 315 may be represented by two separate impedances, $R_S$ and $R_T$, respectively, connected in series to each other. Also, inductance L, which represents the inductance of high-voltage cable 315 from ground shield 706 to ground 107 as discussed with reference to FIG. 7, is placed in parallel to impedances $R_S$ and $R_T$. It should be appreciated that in one embodiment, for example, inductance L depicted in FIG. 8 may be represented in practice by an input impedance of a short piece of a shortened coaxial line. Finally, the signal source may be represented by a voltage $V_S$ and by an internal resistance R. Also, it should be appreciated that signal source may be replaced by a signal load that receives a signal.

It may be assumed that the respective impedances of subscriber side and the transformer side (i.e., $R_S$ and $R_T$, respectively) are matched (i.e., equal), and therefore may be represented by W, the characteristic impedance of high-voltage cable 315. Because of the impedance matching on the subscriber side and transformer side, each side carries half of the signal power. As discussed with reference to FIG. 5, this technique provides an approximately 6 dB loss per octave, as compared to the 12 db per loss octave typically found in the prior art. Also, circuit 800 has a single-pole characteristic at lower frequencies, because the frequency response of circuit 800 is defined by the "RL" circuit defined by R and L.

Optimizing the internal resistance of the source (or the load) also may be considered. One the one hand, to ensure maximum power in the load, it is desirable to match the sources internal resistance with the resistance of the line to which it is connected (i.e., 2W). On the other hand, from the point of view of the subscriber side and/or the transformer side, the internal resistance of the source is in series with the other cable. Therefore, the reflection created in the cable by the "matched" value of R will be ½, as described by the following reflection coefficient:

$$K=(3W-W)/(W+3W)=\tfrac{1}{2} \quad (1)$$

Because the two of the couplers are intended to be included between the terminations at the two ends of the line, and if the RF attenuation of the cable in the transmission band is low, it may be desirable to adopt a reasonable trade off. By increasing the voltage amplitude of the source $V_S$ and lowering its internal resistance R, the reflections can be brought to a more desirable level. For example, when R=W, the reflection coefficient is reduced to ⅓ as follows:

$$K=(2W-W)/(W+2W)=\tfrac{1}{3} \quad (2)$$

It should be appreciated that the examples provided by equations (1) and (2) are just one possible configuration, and are not meant to be exclusive. In practice, fore example, a value of K may be chosen with consideration of the attenuation provided by the particular characteristics of high-voltage cable 315 so as to keep reflections at an acceptable level.

Figure 9:
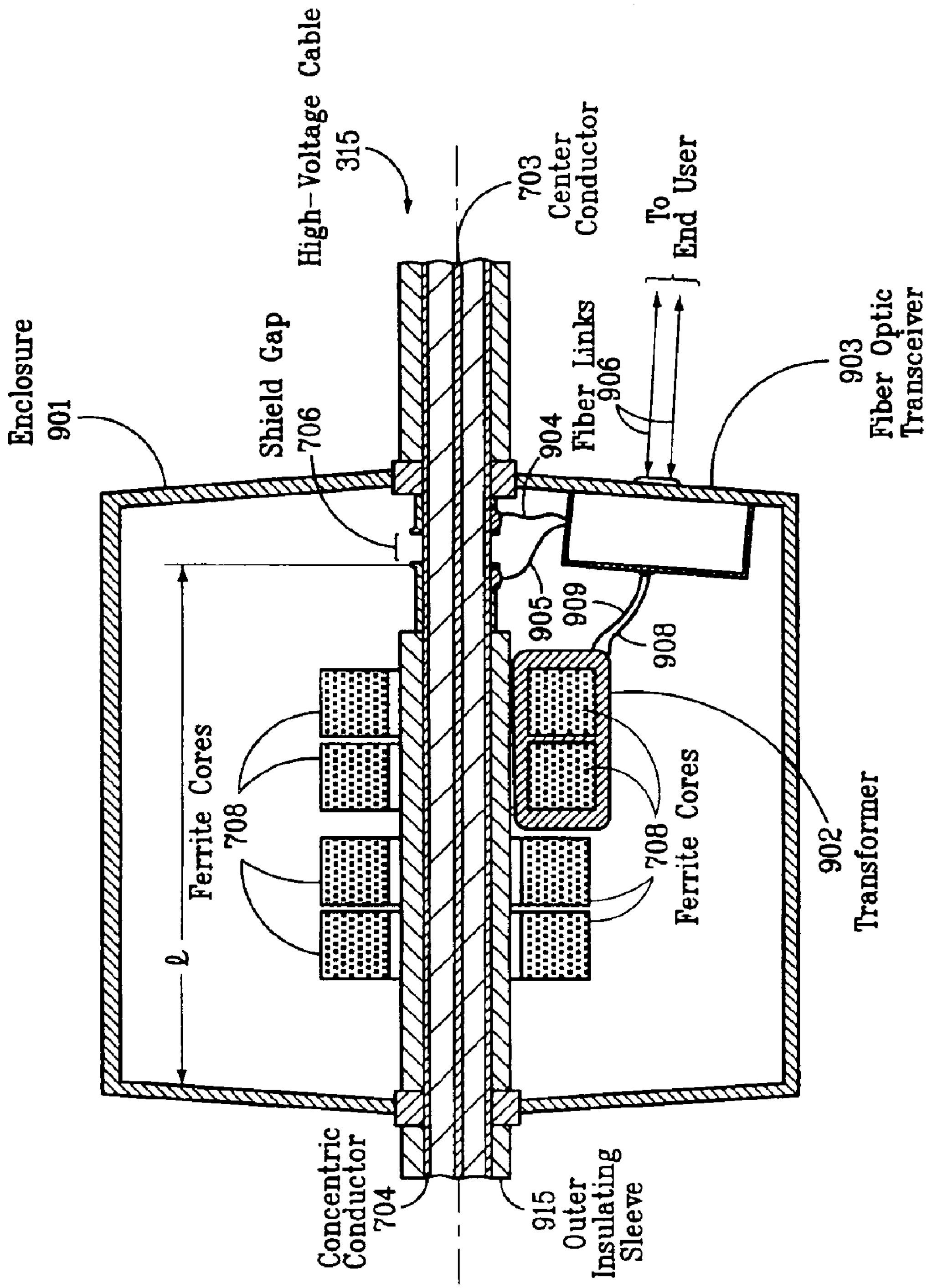
FIG. 9 illustrates a coupler, according to the invention.

FIG. 9 provides an example of a coupler, according to the invention. Although FIG. 9 illustrates the physical configuration of the inventive method, it will be appreciated that the invention may be implemented in any number of configurations (e.g., using various types of enclosures and/or various types of grounding techniques). Accordingly, it should be appreciated that FIG. 9 provides just one example of a coupler contemplated by the invention.

As shown in FIG. 9, high-voltage cable 315 is depicted having center conductor 703, concentric conductor 704, outer insulating sleeve 915, and shield gap 706. In addition, a metal enclosure 901 provides the needed uninterrupted way for the power current flow to back over the interrupted concentric conductor 704. Also, metal enclosure 901 also provides the necessary ground connection (described as ground 407 in FIGS. 4 and 7), and it forms an outer shield for a piece of shortened coaxial line that may be used to provide inductive shunt impedance (described as L with reference to FIGS. 7 and 8).

High-voltage cable 315 also has a series of ferrite cores 708 on the outer side of high-voltage cable 315. Using multiple ferrite cores increases the impedance of subscriber side of high-voltage cable 315 with the length l (as discussed with reference to FIG. 7). Also, ferrite cores may increase the equivalent inductance L of the high-voltage cable 315, which has the same effect as increasing the impedance. Ferrite cores 708 also may provide a current transforming function. As shown in FIG. 9, two of ferrite cores 708 have conductors wound around their perimeter to form a transformer device 902. Although the invention has been described as using ferrite cores, it should be appreciated that other types of cores may be used as well.

Transformer 902 is coupled to a fiber optic transceiver 903. Fiber optic transceiver 903 may be a transmitter/receiver pair commercially available from Microwave Photonic Systems, part number MP-2320/TX (for the transmitter) and part number MP-2320/RX (for the receiver). Fiber optic transceiver 903 is connected to transformer 902 over lines 908 and 909.

In operation, transformer 902 acts to induce an AC current from the high voltage carried by center conductor 703. The induced alternating current is provided to fiber optic transceiver 903 via lines 908 and 909. In addition to having the transmitter/receiver pair, fiber optic transceiver 903 may have circuitry capable of rectifying the AC voltage provided by transformer 902 to a DC voltage. The DC voltage may be in a range (e.g., 12 volts) capable of powering the transmitter/receiver pair in fiber optic transceiver 903, so as to transmit and receive data to the end user over fiber links 906. Also, fiber optic transceiver 903 may have a filtering device (not shown) coupled to lines 908 and 909 so as to pass the AC current in a desired frequency range (e.g., 60 Hz using a low-pass filter).

The data provided to and received from the end users is carried back to a central server (not shown) from fiber optic transceiver 903 via data links 904 and 905. Data links 904 and 905 are in communication with concentric conductor 704. Because concentric conductor 704 typically is not used to carry high voltage, but acts as an inductive shield for high-voltage cable 315, data may be carried to and from the end user via concentric conductor 704. Also, fiber optic transceiver 903 may have a filtering device (not shown)

coupled to lines 904 and 905, so as to pass data signals in a desired frequency range (e.g., signals well above 60 Hz using a high-pass filter), while preventing other signals from passing onto fiber optic transceiver 903 (e.g., 60 Hz power).

The invention was described using a fiber optic-based transceiver. Using a fiber optic transceiver provides the necessary isolation to the end user from the medium or high voltage on center conductor 703, and therefore ensures the safety of people and equipment. However, it should be appreciated that the invention contemplates the user of other types of transceivers, for example, where such isolation is not required.

Figure 10:
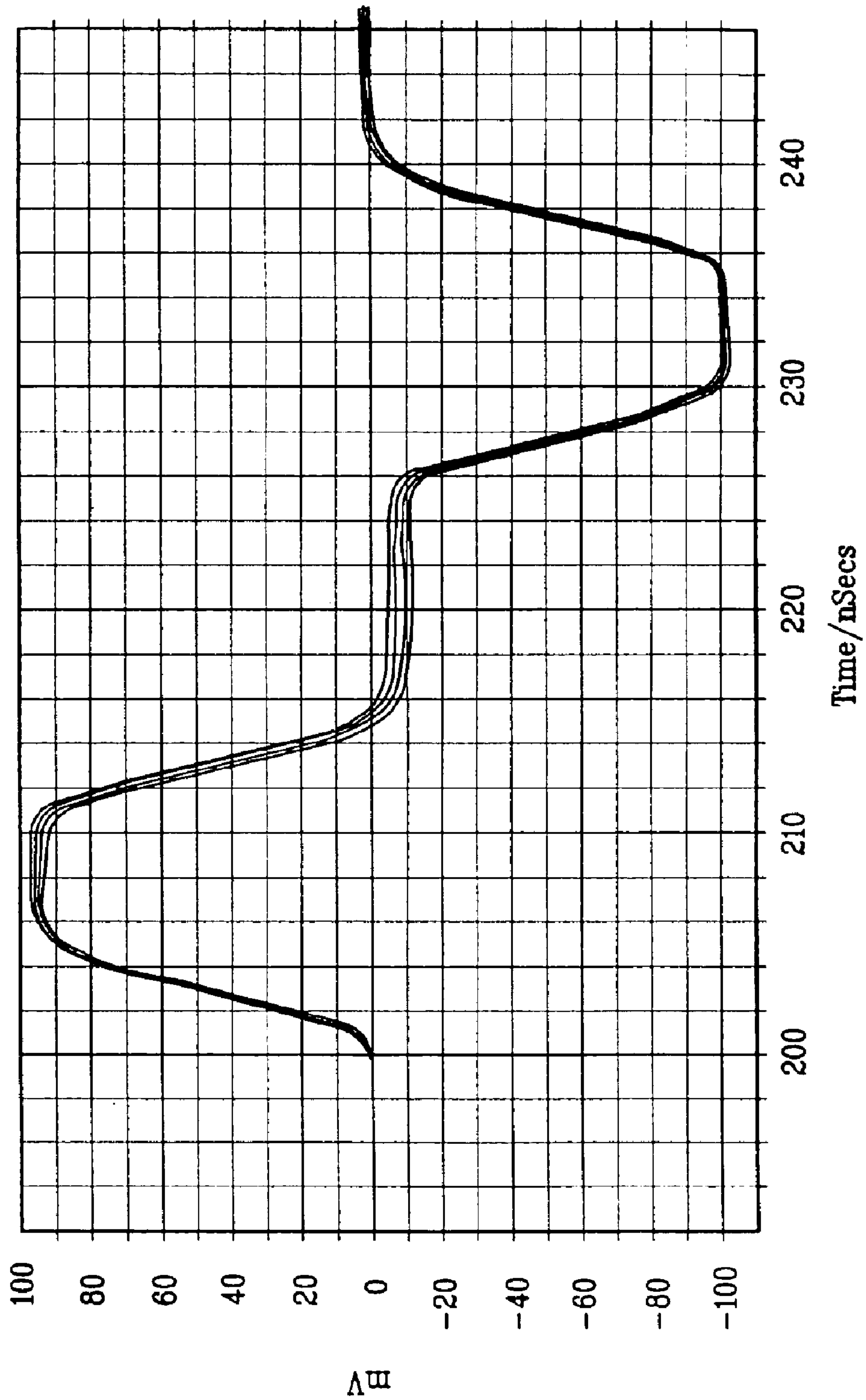
FIG. 10 illustrates reception of bipolar pulses, according to the invention.

It is beneficial to use transmission signals that have very little spectral power density at low frequencies, since the transmission network has a zero at DC. Accordingly, FIG. 10 illustrates several received pulse shapes for two successive pulses of opposite polarity. In particular, FIG. 10 provides a graphical representation of the signal strength available with the invention. Pulses correspond to the range of characteristic impedances of the stub line from 600 Ohms to 2000 Ohms so as to provide minimum intersymbol interference. The transmitted pulses have amplitudes of ±1V and a pulse duration of 7 ns each, with the delay between them equal to 25 ns. As compared to the graphical representation in FIG. 6, depicting prior art systems, it should be appreciated that the invention provides less attenuation of the inputted signal, and over a smaller time interval.

Figure 11:
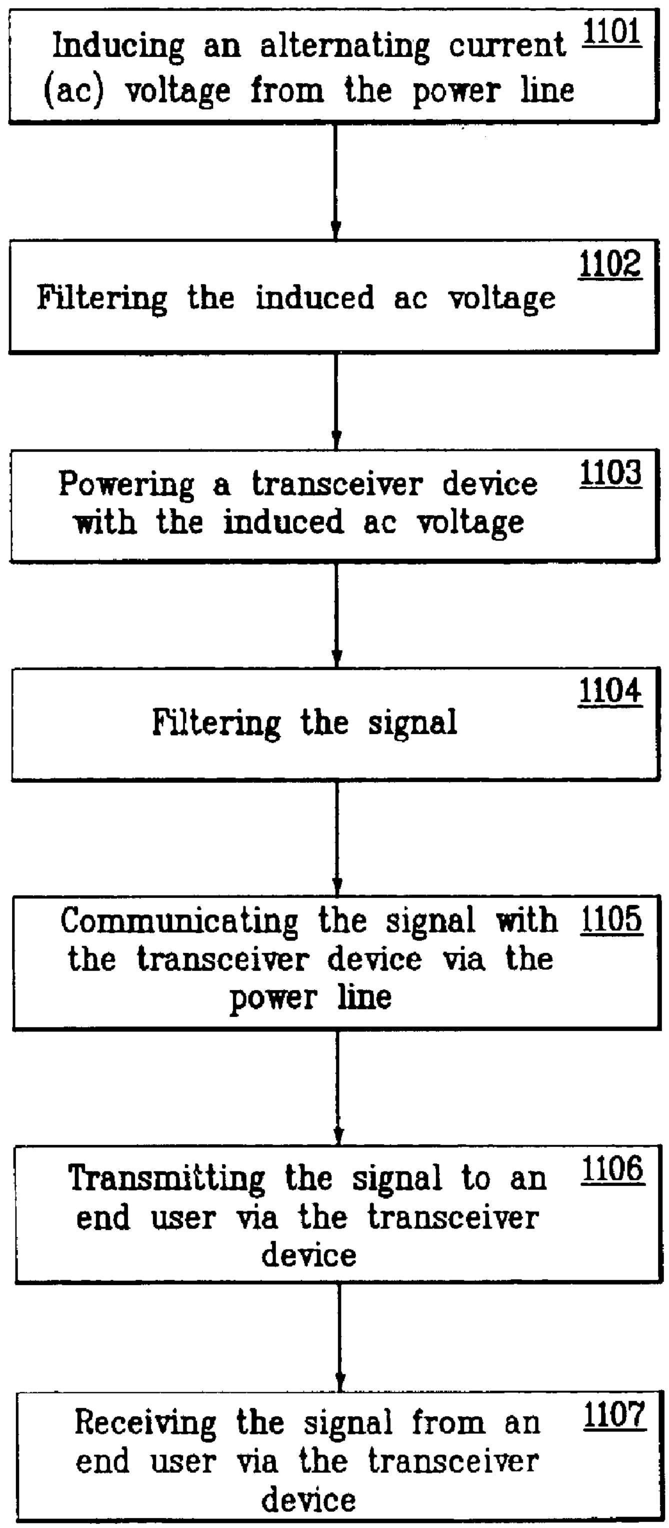
FIG. 11 is a flow diagram of a method for transporting a signal over a power line, according to the invention.

FIG. 11 is a flow diagram of a method for transporting a signal over a power line. As shown in FIG. 11, at step 1101, an AC current voltage is induced from the power line. At step 1102, the induced AC voltage is filtered, for example, by a low-pass filter. At step 1103, a transceiver device is powered by the induced AC voltage. At step 1104, the signal is filtered, for example, by a high-pass filter. At step 1105, the signal is communicated between the transceiver device and the power line. At step 1106, the signal is transmitted to an end user via the transceiver device. At step 1107, the signal is received from an end user via the transceiver device.

The invention is directed to a method and a device for transporting a signal over a power line. The invention occasionally was described in the context underground distribution systems, but is not so limited to, regardless of any specific description in the drawing or examples set forth herein. For example, the invention may be applied to overhead networks. Also, the invention was described in the context of medium voltage cables, but also includes high voltage cables. It will be understood that the invention is not limited to use of any of the particular components or devices herein. Indeed, this invention can be used in any application that requires the testing of a communications system. Further, the system disclosed in the invention can be used with the method of the invention or a variety of other applications.

While the invention has been particularly shown and described with reference to the embodiments thereof, it will be understood by those skilled in the art that the invention is not limited to the embodiments specifically disclosed herein. Those skilled in the art will appreciate that various changes and adaptations of the invention may be made in the form and details of these embodiments without departing from the true spirit and scope of the invention as defined by the following claims.

What is claimed is:

1. A method for communicating a data signal over a power line carrying a power signal, wherein the method comprises:
- providing a transformer having a winding and a core;
- disposing the core of the transformer in sufficiently close proximity to the power line to induce an AC voltage in the winding from the power signal carried by the power line;
- powering a transceiver device with the induced AC voltage; and
- communicating the data signal with the transceiver device via the power line.

2. The method of claim 1, further comprising transmitting the data signal to an end user communication device via the transceiver device.

3. The method of claim 2, wherein the data signal is transmitted over a fiber optic link.

4. The method of claim 2, wherein the data signal is wirelessly transmitted.

5. The method of claim 2, wherein the said transmitted data signal is a radio frequency signal.

6. The method of claim 5, wherein the transmitted data signal is a fiber optic radio frequency signal.

7. The method of claim 1, further comprising receiving the data signal from an end user communication device via the transceiver device.

8. The method of claim 7, wherein the data signal is received over a fiber optic link.

9. The method of claim 1, further comprising filtering the induced AC voltage.

10. The method of claim 1, further comprising filtering the data signal.

11. The method of claim 1, further comprising converting the induced an AC voltage to a direct current voltage.

12. The method of claim 1, wherein said core is disposed substantially around the entire circumference of the power line.

13. The method of claim 1, wherein the power line comprises a center conductor, an insulator, and a second conductor external to the insulator.

14. The method of claim 1, wherein the induced voltage is induced from the current carried by the power line.

15. The device of claim 1, further comprising filtering the data signal received with a high pass filter.

16. The method of claim 1, wherein powering the transceiver comprises providing the induced voltage to a power supply.

17. The method of claim 1, wherein the communicating the data signal comprises receiving the data signal from the power line.

18. The method of claim 17, further comprising transmitting the data signal to an end user device with the transceiver device via a radio signal.

19. The method of claim 17, wherein the data signal received from the power line is supplied via an access point to the Internet.

20. A device for communicating a data signal over a power line, wherein the power line carries a power signal, the device comprising:
- a transformer device having a winding and a core configured to be disposed in sufficiently close proximity to the power line to induce an AC voltage from the power signal carried by the power line in the winding;
- a transceiver that is configured to receive power from the transformer device, and
- wherein said transceiver is configured to communicate the data signal through the power line.

21. The device of claim 20, further comprising:

a ferrite member disposed in proximity to the power line for increasing the inductance of a section of the power line; and an enclosure for housing the ferrite member, the transformer device, and the transceiver device.

22. The device of claim 21, wherein the enclosure provides a ground potential.

23. The device of claim 20, wherein the power line comprises a center conductor, an insulator, and a second conductor external to the insulator, wherein the transceiver communicates the data signal through the second conductor.

24. The device of claim 23, wherein the power line includes an outer insulator external to the second conductor, said outer insulator includes a gap, and the transceiver is coupled to the second conductor at said gap in the outer insulator of the power line.

25. The device of claim 20, wherein the transformer device is a current transformer.

26. The device of claim 20, wherein the transceiver is a fiber optic transceiver.

27. The device of claim 20, wherein the power received by the transceiver is an AC power signal and the transceiver converts the AC power signal to a direct current (DC) power signal.

28. The device of claim 20, wherein the power received by the transceiver is an AC power signal and further comprising a low-pass filter for filtering the AC power signal provided by the transformer device.

29. The device of claim 20, further comprising a high-pass filter for filtering the data signal provided via the power line.

30. The device of claim 20, wherein said core is disposed substantially around the entire circumference of the power line.

31. The device of claim 20, wherein the transceiver is a radio frequency transceiver.

32. The device of claim 20, wherein the transceiver is configured to receive the data signal from the power line.

33. The device of claim 32, wherein the transceiver is further configured to transmit the data signal to an end user device via a radio frequency.

34. The device of claim 32, wherein the data signal received from the power line is supplied via an access point to the Internet.

35. A method for providing communication of a data signal over a coaxial power cable having a center conductor carrying a power signal, an outer conductor, and an outer insulator outside the outer conductor, the method comprising:

removing a portion of the outer insulator of the coaxial power cable;

coupling a communication device to the outer conductor of the coaxial power cable where the outer insulator is removed;

providing a transformer having a winding and a core;

disposing the core of the transformer in sufficiently close proximity to the power line to induce an AC voltage in the winding from the power signal carried by the power line; and providing the induced voltage power to power the communication device.

36. The method of claim 35, further comprising grounding the outer conductor at a predetermined distance from the communication device.

37. The method of claim 36, further comprising selecting the predetermined length to provide a predetermined inductance value.

38. The method of claim 35, further comprising providing at least one ferrite core outside the outer insulator to adjust an inductance.

39. The method of claim 35, further comprising providing a gap in the outer conductor, wherein the communication device is communicatively coupled to the outer conductor on both sides of the gap.

40. The method of claim 35, wherein the induced voltage is supplied to the communication device via a power supply.

41. The method of claim 35, wherein the induced voltage is induced from the current carried by the power line.

42. A system for communicating a data signal on the outer conductor of an electric power line carrying an AC power signal having a current signal and a first voltage on a center conductor, comprising:

a transceiver in communication with the electric power line, wherein the transceiver is communicatively coupled to the outer conductor to provide communications therethrough, providing a transformer having a winding and a core;

disposing the core of the transformer in sufficiently close proximity to the power line to induce an second voltage in the winding from the power signal carried by the center conductor line;

a power supply that converts the second voltage to a direct current voltage, wherein the direct current voltage is provided to transceiver; and wherein said transceiver is conductively coupled to the outer conductor to facilitate data communications therethrough.

43. The system of claim 42, wherein the data signal communicated through the outer conductor traverses an access point to the Internet.

44. The system of claim 42, wherein the power line has an insulative cover, a portion of which is removed.

45. The system of claim 44, wherein the removed portion of the insulative cover exposes the outer conductor.

46. The system of claim 42, wherein the transceiver receives signals from and transmits data signals to a customer premise device.

47. The system of claim 46, wherein the customer premise device is at least one of the following: a computer, a telephone, and a facsimile machine.

48. The system of claim 42, wherein said core is disposed substantially around the entire circumference of the power line.

* * * * *